United States Patent
Pesavento

(10) Patent No.: US 7,307,534 B2
(45) Date of Patent: *Dec. 11, 2007

(54) RFID TAG USING HYBRID NON-VOLATILE MEMORY

(75) Inventor: Alberto Pesavento, Seattle, WA (US)

(73) Assignee: IMPINJ, Inc., Seattle, WA (US)

( * ) Notice: Subject to any disclaimer, the term of this patent is extended or adjusted under 35 U.S.C. 154(b) by 212 days.

This patent is subject to a terminal disclaimer.

(21) Appl. No.: 11/237,012

(22) Filed: Sep. 28, 2005

(65) Prior Publication Data

US 2006/0071793 A1   Apr. 6, 2006

Related U.S. Application Data

(63) Continuation-in-part of application No. 11/016,546, filed on Dec. 17, 2004, and a continuation-in-part of application No. 11/015,293, filed on Dec. 17, 2004, and a continuation-in-part of application No. 10/830,280, filed on Apr. 21, 2004, now Pat. No. 7,212,446.

(51) Int. Cl.
*G08B 13/14*   (2006.01)

(52) U.S. Cl. ............................. 340/572.1; 365/185.01; 365/185.28; 365/185.33

(58) Field of Classification Search .. 340/572.1–572.9; 711/103, 170; 365/185.28, 185.01, 185.33
See application file for complete search history.

(56) References Cited

U.S. PATENT DOCUMENTS

| | | | | |
|---|---|---|---|---|
| 5,822,714 | A * | 10/1998 | Cato | 702/108 |
| 5,890,199 | A * | 3/1999 | Downs | 711/106 |
| 6,294,997 | B1 * | 9/2001 | Paratore et al. | 340/572.1 |
| 6,411,545 | B1 * | 6/2002 | Caywood | 365/185.07 |
| 7,106,642 | B2 * | 9/2006 | Hojo | 365/200 |
| 2005/0251617 | A1 * | 11/2005 | Sinclair et al. | 711/103 |

* cited by examiner

*Primary Examiner*—Jeffery Hofsass
*Assistant Examiner*—Hoi C. Lau
(74) *Attorney, Agent, or Firm*—Merchant & Gould; Carl K. Turk

(57) ABSTRACT

An RFID tag includes a non-volatile memory (NVM) circuit with at least two distinct types of NVM sub-circuits that share common support circuitry. Different types of NVM sub-circuits include ordinary NVM circuits that provide a logic output upon being addressed, programmable fuses that provide an output upon transitioning to a power-on state, NVM circuits that provide an ON/OFF state output, and the like. Some of the outputs are used to calibrate circuits within a device following power-on. Other outputs are used to store information to be employed by various circuits.

28 Claims, 19 Drawing Sheets

*TAG WITH PROGRAMMABLE FUSES AND ORDINARY NVM*

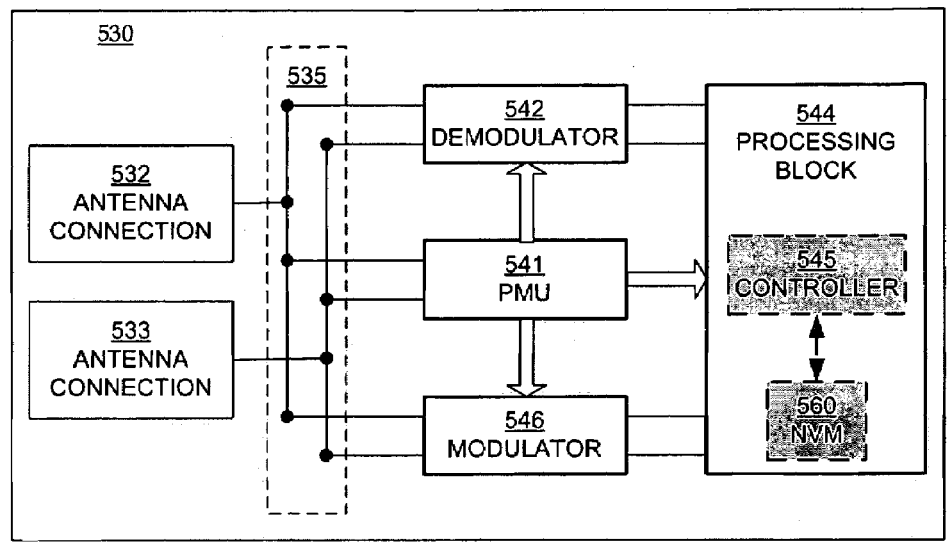
FIGURE 5
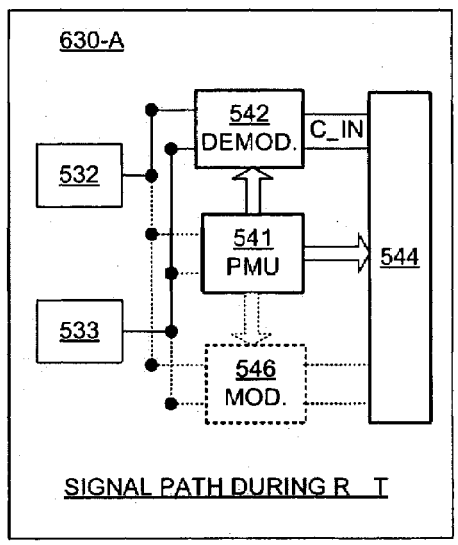 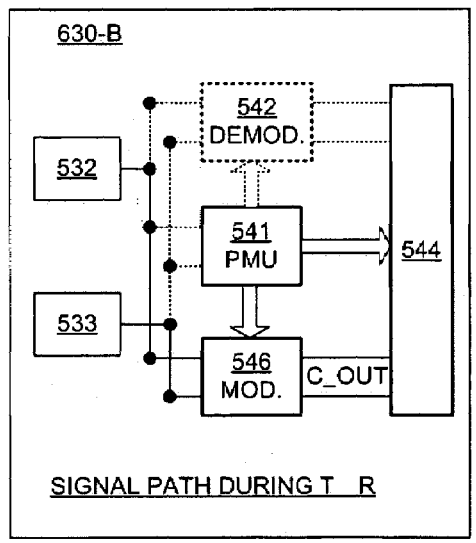
FIGURE 6A     FIGURE 6B

*TAG WITH PROGRAMMABLE FUSES*

*TAG WITH ORDINARY NVM*

*TAG WITH PROGRAMMABLE FUSES AND ORDINARY NVM*

*DEVICE WITH HYBRID NVM*

TAG WITH HYBRID NVM
(2 TYPES OF NVM)

TAG WITH HYBRID NVM
(3 TYPES OF NVM)

*HYBRID NVM WITH CLOOP*

"ORDINARY" TYPE OF NVM CELL (PROVIDES LOGIC OUTPUT)

TYPE OF NVM CELL

"PROGRAMMABLE FUSE"

TYPE OF NVM CELL (SUITABLE FOR TRIMMING ANALOG CIRCUIT)

TYPE OF NVM CELL (PROVIDES ON / OFF STATES)

RFID TAG USING HYBRID NON-VOLATILE MEMORY

RELATED APPLICATIONS

This utility patent application is a continuation-in-part (CIP) of U.S. patent application Ser. No. 10/830,280 (IMPJ-0082) filed on Apr. 21, 2004, now U.S. Pat. No. 7,212,446 Ser. No. 11/016,546 (IMPJ-0125) filed on Dec. 17, 2004; and Ser. No. 11/015,293 (IMPJ-0127) filed on Dec. 17, 2004. The benefit of the earlier filing date of the parent applications is hereby claimed under 35 U.S.C. §120.

Furthermore, this application may be found to be related to U.S. Pat. Ser. No. 6,853,583 and U.S. patent application Ser. No. 10/813,907 (IMPJ-0027A) filed on Mar. 30, 2004; Ser. No. 10/814,866 (IMPJ-0027B) filed on Mar. 30, 2004; and Ser. No. 10/814,868 (IMPJ-0027C) filed on Mar. 30, 2004.

This application may also be found related to U.S. patent application titled "HYBRID NON-VOLATILE MEMORY", by inventor Alberto Pesavento, filed with the USPTO on the same day as the present application, and due to be assigned to the same assignee.

The referenced Patent and patent applications, as well as the parent patent applications are incorporated herein by reference.

TECHNICAL FIELD

The present invention relates to RFID tags; and more particularly, to RFID tags with hybrid Non-Volatile Memory (NVM) devices, which include multiple types of NVM circuits supported by common support circuitry.

BACKGROUND

Radio Frequency IDentification (RFID) systems typically include RFID tags and RFID readers (the former are also known as labels or inlays, and the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted-back RF wave either originally, or by reflecting back a portion of the interrogating RF wave, in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags.

The tag memory may include a volatile memory and a non-volatile memory. Volatile memory loses any data as soon as the system is turned off. Thus, it requires constant power to remain viable. Most types of random access memory (RAM) fall into this category. Non-volatile memory does not lose its data when the system or device is turned off. An NVM device may be implemented as a MOS transistor that has a source, a drain, an access or a control gate, and a floating gate. It is structurally different from a standard MOSFET in its floating gate, which is electrically isolated, or "floating".

A range of considerations including a purpose of the device, power consumption, size, retention capacity and duration may influence design of non-volatile memory devices. For example, some NVM devices may be categorized as floating gate or charge-trapping from a programming perspective.

Non-volatile memory devices may also be implemented as NVM arrays that include a plurality of NVM cells arranged in rows and columns. In general, single-transistor n-channel NVM cells operate as follows. During an erase operation, electrons are removed from a floating gate of the NVM cell, thereby lowering the threshold voltage of the NVM cell. During a program operation, electrons are inserted into the floating gate of the NVM cell, thereby raising the threshold voltage of the NVM cell. Thus, during program and erase operations, the threshold voltages of selected NVM cells are changed. During a read operation, read voltages are applied to selected NVM cells. In response, read currents flow through these selected NVM cells.

SUMMARY

Aspects of the invention are directed to an RFID tag using a hybrid NVM circuit that includes a plurality of NVM sub-circuits of different types. The NVM sub-circuits, which can store data in a way that survives loss of power, may differ in their structure and/or function, but share common support circuitry.

According to one example aspect, one NVM sub-circuit is structured to provide its stored data during a transition period from a power-off state to a power-on state. Another NVM sub-circuit of the same NVM may provide its stored data upon being addressed in the power-on state.

According to another aspect, a first NVM sub-circuit may be adapted to provide a logic output to an operational component, while a second NVM sub-circuit provides an ON/OFF state output to another operational component.

In each aspect two or more NVM sub-circuits of the hybrid NVM circuit share at least a portion of the support circuitry.

Operational components may include a power-on reset circuit, a random number generator, a state machine, an oscillator, an antenna tuner, a modulator, a demodulator, a rectifier, a power management unit, and the like.

It will be appreciated that a hybrid NVM circuit according to aspects may include any number of NVM sub-circuits of different types. The NVM sub-circuits may be of any type and share a portion or the whole support circuitry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an embodiment of a block diagram for an electrical circuit that may be employed in an RFID tag such as the RFID tag of FIG. 2;

FIGS. 6A and 6B illustrate two versions of the electrical circuit of FIG. 5 emphasizing signal flow in receive and transmit operational modes, respectively;

DETAILED DESCRIPTION

Figure 1:
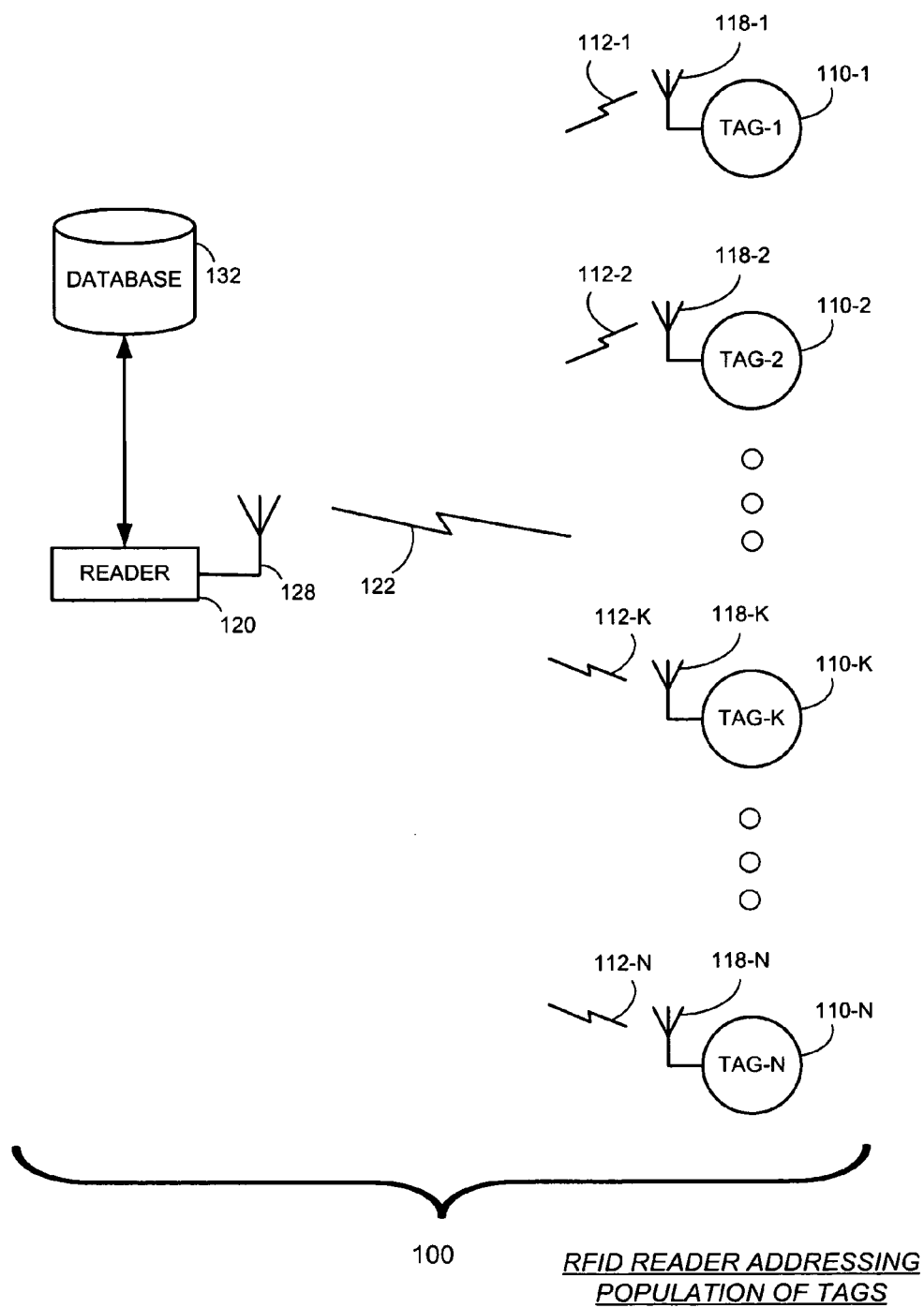
FIG. 1 is a diagram of an example RFID system including an RFID reader communicating with a plurality of RFID tags in its field of view.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The term "ordinary NVM" refers to an NVM circuit or device that stores and outputs a logic value to be used by an operational component. As such, the "ordinary NVM" may or may not be arranged to provide the logic value for special purposes such as trimming an analog circuit. The terms "RFID reader" and "RFID tag" are used interchangeably with the terms "reader" and "tag", respectively, throughout the text and claims.

FIG. 1 is a diagram of an example RFID system including an RFID reader communicating with a plurality of RFID tags in its field of view.

System 100 includes RFID reader 120 and N RFID tags 110-1, 110-2, . . . , 110-K, . . . , 110-N in the vicinity of each other and of reader 120. Reader 120 in system 100 is communicating with the tags during an event.

RFID reader 120 has an antenna 128, and is in communication with database 132. Reader 120 transmits an interrogating Radio Frequency (RF) wave 122, which can be perceived by tags 110-1, 110-2, . . . , 110-K, . . . , 110-N.

RFID tags 110-X can be passive tags or active tags, i.e. having their own power source. Where tags 110-X are passive tags, they are powered from wave 122.

Each tag 110-X (X=1, 2, 3 . . . N) includes an antenna 118-X. Upon sensing interrogating RF wave 122, each tag 110-X may generate a wave 112-X in response. RFID reader 120 senses and interprets waves 112-X.

In FIG. 1, interrogating RF wave 122 is shown as larger than waves 112-X. This is to signify that interrogating RF wave 122 typically has a higher intensity.

Reader 120 and tag 110-X thus exchange data via waves 122 and 112-X. In a session of such an exchange, each encodes, modulates, and transmits data to the other, and each receives, demodulates, and decodes data from the other. The data is modulated onto, and decoded from, RF waveforms, as described previously.

Encoding the data can be performed in a number of different ways including protocols that are devised to communicate in terms of symbols. The bits and/or symbols used in communication may be named according to their function. For example, it is customary to refer to such groups as "commands", "data", "payload", "handle", and so on.

Figure 2:
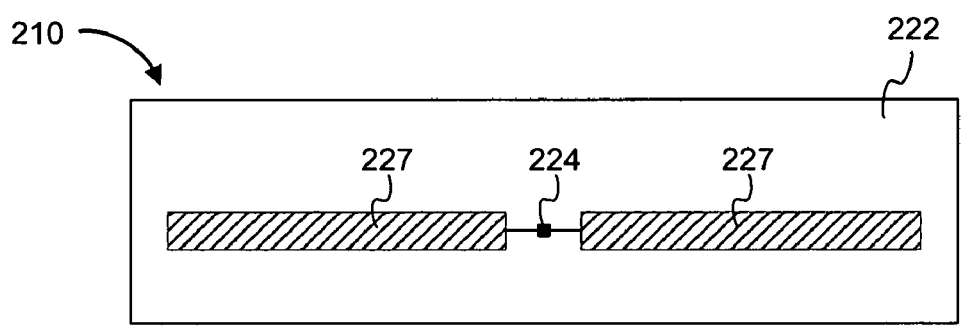
FIG. 2 is a diagram of an RFID tag such as one of the tags of FIG. 1.

FIG. 2 is a diagram of RFID tag 210 such as one of the tags of FIG. 1. Tag 210 is implemented as a passive tag, meaning it does not have its own power source. Much of what is described in this document, however, applies also to active tags.

Tag 210 is formed on a substantially planar inlay 222, which can be made in many ways known in the art. Tag 210 also includes two antenna segments 227, which are usually flat and attached to inlay 222. Antenna segments 227 are shown here forming a dipole, but many other embodiments using any number of antenna segments are possible.

Tag 210 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

Figure 3:
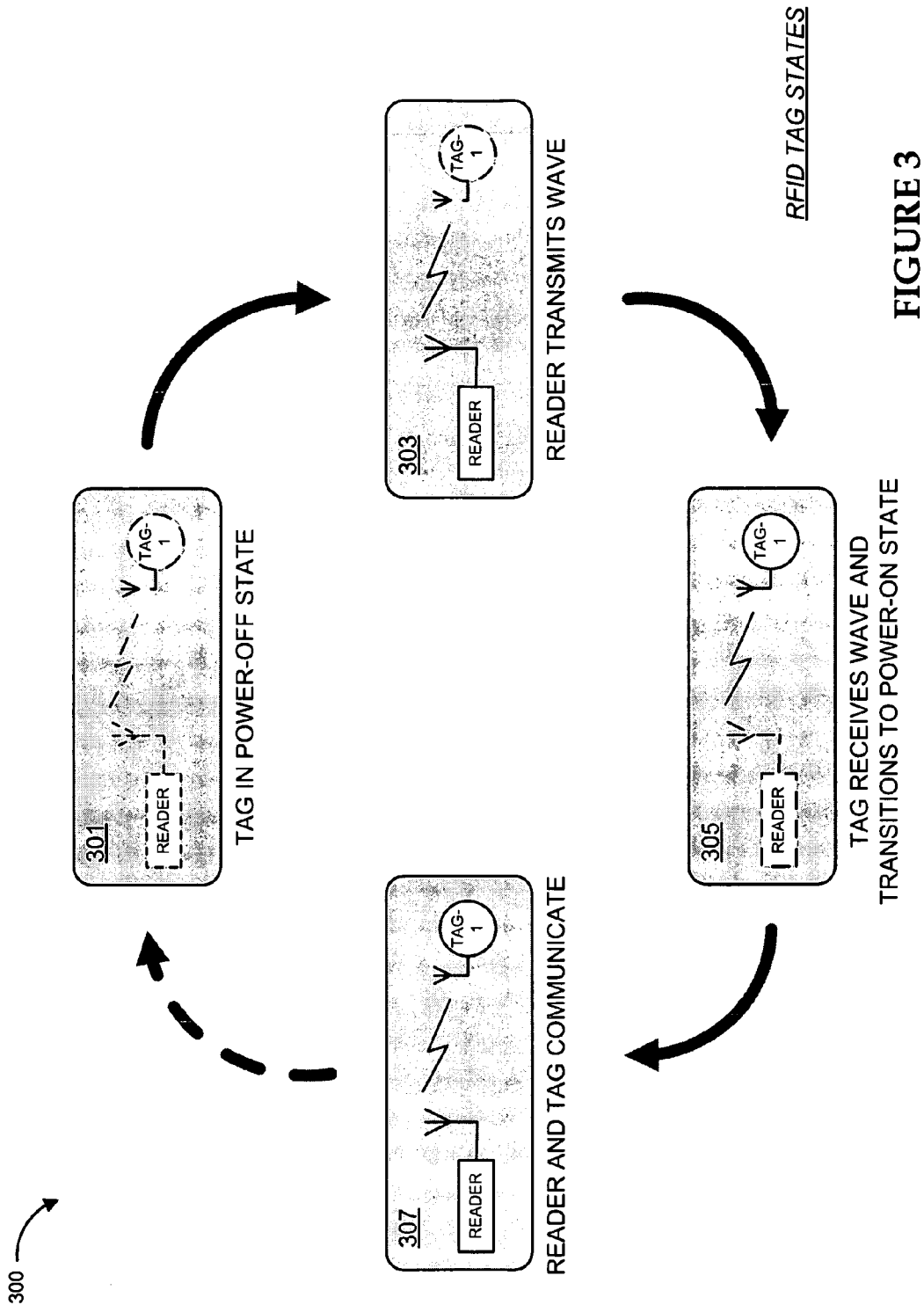
FIG. 3 is a diagram showing different states of an RFID tag such as the tag of FIG. 2.

FIG. 3 is a diagram showing different states of an RFID tag such as the tag of FIG. 2.

As shown in diagram 300, in a power-off state (301), tag and reader do not communicate. In the next state (303), the reader transmits a wave. As described above, the wave may be a CW wave, a modulated wave, and the like.

In state 305, the tag receives the wave and transitions to a power-on state. In case of a passive tag, the tag may use the energy of the received wave to power its circuitry, calibrate, configure, and operate various operational components. The tag may store information for the calibration, configuration, and operation of the operational components in non-volatile memory circuits.

Following state 305 is state 307, where the tag and the reader communicate. The reader may interrogate the tag, transmit commands, receive backscattered information from the tag, even modify contents of a tag memory.

When the communication is completed, the tag and the reader return to state 301 with the tag transitioning back to the power-off state.

The components of the RFID system of FIG. 1 may communicate with each other in any number of modes. One such mode is called full duplex. Another such mode is called half-duplex, and is described below.

Figure 4:
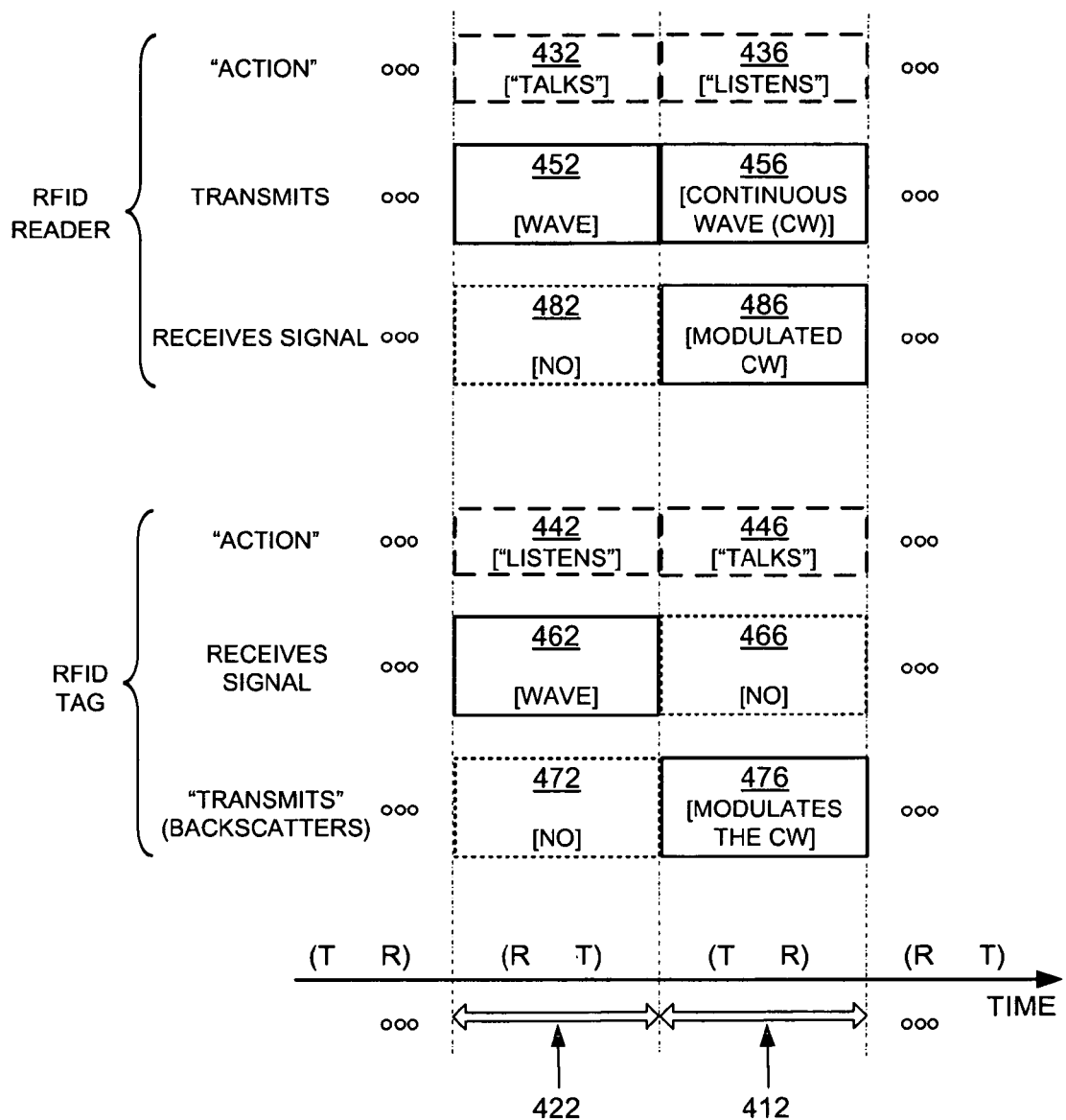
FIG. 4 is a conceptual diagram for explaining the half-duplex mode of communication between the components of the RFID system of FIG. 1, during operation.

FIG. 4 is a conceptual diagram for explaining the half-duplex mode of communication between the components of the RFID system of FIG. 1, during operation.

The explanation is made with reference to a TIME axis, and also to a human metaphor of "talking" and "listening". The actual technical implementations for "talking" and "listening" are now described.

RFID reader 120 and RFID tag 110 talk and listen to each other by taking turns. As seen on axis TIME, when reader 120 talks to tag 110 the session is designated as "R→T", and when tag 110 talks to reader 120 the communication session is designated as "T→R". Along the TIME axis, a sample R→T communication session occurs during a time interval 412, and a following sample T→R communication session occurs during a time interval 422. Of course intervals 412, 422 can be of different durations—here the durations are shown approximately equal only for purposes of illustration.

According to blocks 432 and 436, RFID reader 120 talks during interval 412, and listens during interval 422. According to blocks 442 and 446, RFID tag 110 listens while reader 120 talks (during interval 412), and talks while reader 120 listens (during interval 422).

In terms of actual technical behavior, during interval 412, reader 120 talks to tag 110 as follows. According to block 452, reader 120 transmits wave 122, which was first described in FIG. 1. At the same time, according to block 462, tag 110 receives wave 122 and processes it. Meanwhile, according to block 472, tag 110 does not backscatter with its antenna, and according to block 482, reader 120 has no wave to receive from tag 110.

During interval 426, tag 110 talks to reader 120 as follows. According to block 456, reader 120 transmits a Continuous Wave (CW), which can be thought of as a carrier signal that ideally encodes no information. As discussed before, this carrier signal serves both to be harvested by tag 110 for its own internal power needs, and also as a wave that tag 110 can backscatter. Indeed, during interval 422, according to block 466, tag 110 does not receive a signal for processing. Instead, according to block 476, tag 110 modulates the CW emitted according to block 456, so as to generate backscatter wave 112. Concurrently, according to block 486, reader 120 receives backscatter wave 112 and processes it.

FIG. 5 illustrates an embodiment of a block diagram for electrical circuit 430 that may be employed in an RFID tag such as the RFID tag of FIG. 2.

Circuit 530 has a number of main components that are described in this document. Circuit 530 may have a number of additional components from what is shown and described, or different components, depending on the exact implementation.

Circuit 530 includes at least two antenna connections 532, 533, which are suitable for coupling to one or more antenna segments (not shown in FIG. 5). Antenna connections 532, 533 may be made in any suitable way, such as pads and so on. In a number of embodiments more antenna connections are used, especially in embodiments where more antenna segments are used.

Circuit 530 includes a section 535. Section 535 may be implemented as shown, for example as a group of nodes for proper routing of signals. In some embodiments, section 535 may be implemented otherwise, for example to include a receive/transmit switch that can route a signal, and so on.

Circuit 530 also includes a Power Management Unit (PMU) 541. PMU 541 may be implemented in any way known in the art, for harvesting raw RF power received via antenna connections 532, 533. In some embodiments, PMU 541 includes at least one rectifier, and so on.

In operation, an RF wave received via antenna connections 532, 533 is received by PMU 541, which in turn generates power for components of circuit 530. This is true for either or both of R→T sessions (when the received RF wave carries a signal) and T→R sessions (when the received RF wave carries no signal).

Circuit 530 additionally includes a demodulator 542. Demodulator 542 demodulates an RF signal received via antenna connections 532, 533. Demodulator 542 may be implemented in any way known in the art, for example including an attenuator stage, amplifier stage, and so on.

Circuit 530 further includes a processing block 544. Processing block 544 receives the demodulated signal from demodulator 542, and may perform operations. In addition, it may generate an output signal for transmission.

Processing block 544 may be implemented in any way known in the art. For example, processing block 544 may include a number of components, such as a processor, a memory, a decoder, an encoder, and so on.

Processing block 544 may also include NVM circuit 560 and an associated controller 545. According to one embodiment, NVM circuit 560 may be a hybrid NVM circuit comprising two or more distinct NVM sub-circuits.

Circuit 530 additionally includes a modulator 546. Modulator 546 modulates an output signal generated by processing block 544. The modulated signal is transmitted by driving antenna connections 532, 533, and therefore driving the load presented by the coupled antenna segment or segments. Modulator 546 may be implemented in any way known in the art, for example including a driver stage, amplifier stage, and so on.

In one embodiment, demodulator 542 and modulator 546 may be combined in a single transceiver circuit. In another embodiment, modulator 546 may include a backscatter transmitter or an active transmitter.

It will be recognized at this juncture that circuit 530 can also be the circuit of an RFID reader according to the invention, without needing PMU 541. Indeed, an RFID reader can typically be powered differently, such as from a wall outlet, a battery, and so on. Additionally, when circuit 530 is configured as a reader, processing block 544 may have additional Inputs/Outputs (I/O) to a terminal, network, or other such devices or connections.

In terms of processing a signal, circuit 530 operates differently during a R→T session and a T→R session. The treatment of a signal is described below.

FIGS. 6A and 6B illustrate two versions of the electrical circuit of FIG. 5 emphasizing signal flow in receive and transmit operational modes, respectively.

Version 630-A shows the components of circuit 530 for a tag, further modified to emphasize a signal operation during a R→T session (receive mode of operation) during time interval 412 of FIG. 4. An RF wave is received from antenna connections 532, 5.33, a signal is demodulated from demodulator 542, and then input to processing block 544 as C_IN. In one embodiment according to the present invention, C_IN may include a received stream of symbols. It is during this operation that the indirect instruction is received by the reader as to what backscatter period to use.

Version 630-A shows as relatively obscured those components that do not play a part in processing a signal during a R→T session. Indeed, PMU 541 may be active, and may be converting raw RF power. And modulator 546 generally does not transmit during a R→T session. Modulator 546 typically does not interact with the received RF wave significantly, either because switching action in section 535 of FIG. 5 decouples the modulator 546 from the RF wave, or by designing modulator 546 to have a suitable impedance, and so on. It is during this operation that the determined backscatter period is used.

While modulator 546 is typically inactive during a R→T session, it need not be always the case. For example, during a R→T session, modulator 546 could be active in other ways. For example, it could be adjusting its own parameters for operation in a future session.

Version 630-B shows the components of circuit 530 for a tag, further modified to emphasize a signal operation during a T→R session during time interval 422 of FIG. 4. A signal is output from processing block 544 as C_OUT. In one embodiment according to the present invention, C_OUT may include a transmission stream of symbols. C_OUT is then modulated by modulator 546, and output as an RF wave via antenna connections 532, 533.

Version 630-B shows as relatively obscured those components that do not play a part in processing a signal during a T→R session. Indeed, PMU 541 may be active, and may be converting raw RF power. And demodulator 542 generally does not receive during a T→R session. Demodulator 542 typically does not interact with the transmitted RF wave, either because switching action in section 535 decouples the demodulator 542 from the RF wave, or by designing demodulator 542 to have a suitable impedance, and so on.

While demodulator 542 is typically inactive during a T→R session, it need not be always the case. For example, during a T→R session, demodulator 542 could be active in other ways. For example, it could be adjusting its own parameters for operation in a future session.

Figure 7A:
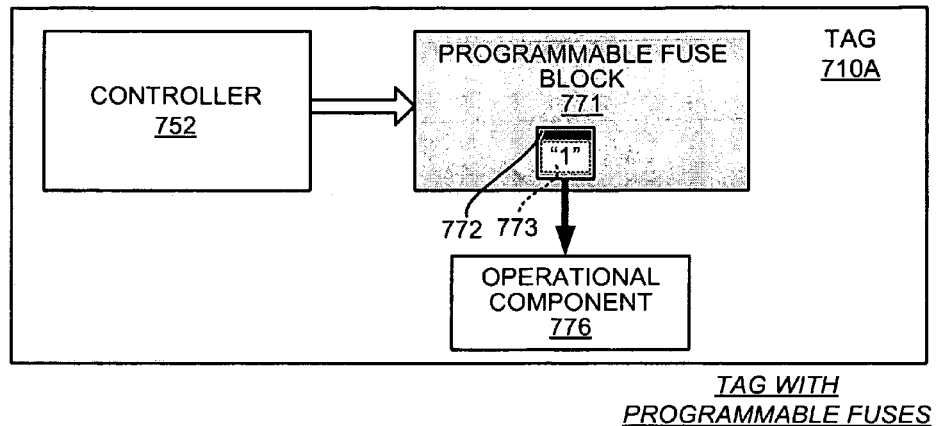
FIG. 7A is a block diagram of an RFID tag that includes a programmable fuse block for storing data such as calibration data to be used by an operational component.

FIG. 7A is a block diagram of RFID tag 710A that includes a programmable fuse block for storing data such as calibration data to be used by an operational component.

Tag 710A includes programmable fuse block 771, operational component 776, and controller 752. Tag 710A may use a variety of NVM circuits depending on available power, size, use of the stored information, and the like.

A programmable fuse is essentially a non-volatile memory because it retains stored information in a power off state. A programmable fuse may be one time programmable (OTP) or multiple times programmable (MTP). Programmable fuse block 771 shown in the figure may include one or more programmable fuses. In case of multiple fuses, programmable fuse block 771 may include fuses that are arranged in an array.

Programmable fuse block 771 may provide an output to operational component 776 immediately following a transition to power-on state, while other types of NVM circuits may need to be addressed prior to providing their output. Accordingly, programmable fuse block 771 provides a fast NVM circuit that may be employed to calibrate operational components of a tag during a power-on mode.

Tag 710A also includes an operational component 776. As will be seen later in this description, operational component 776 is intended to be any one or more of a large possible number of components of tag 710A, including programmable fuse block 771 itself, or even a component external to tag 710A.

Operational component 776 may operate based on configuration/calibration data. A number of ways for accomplishing this are described later in this document. A distinction should be kept in mind, however, that programmable fuse block 771 may be employed to store other types of data in addition to the calibration data, such as a serial number of the RFID tag.

Programmable fuse block can store data 773 in cell 772. Data 773 encodes at least one value, or a series of values, for one or more operational components such as operational component 776. Data 773 may be the calibration data for operational component 776. Cell 772 may be a programmable fuse, a group of fuses, and the like.

Data 773 encodes at least one value, or a series of values, for one or more operational components such as operational component 776. In some embodiments, data 773 is at least one logical bit, such as a 1 or a zero, stored in cell 772.

Data 773 may be input in operational component 776 via any number of paths. As data 773 is moved, it may change nature, or what it encodes.

Tag 710A moreover includes controller 752. Controller 752 is adapted to program data 773 in cell 772. In addition, controller 752 may cooperate with other components, such as operational component 776.

As written above, operational component 776 may be any one or more of any of the tag circuit components. If more than one, then a plurality of calibration data may be stored. For each one of the possible operational components, one or more of their operation or performance characteristics may be controlled and/or changed by the calibration data. A number of examples and manners of controlling are described in this document.

Figure 7B:
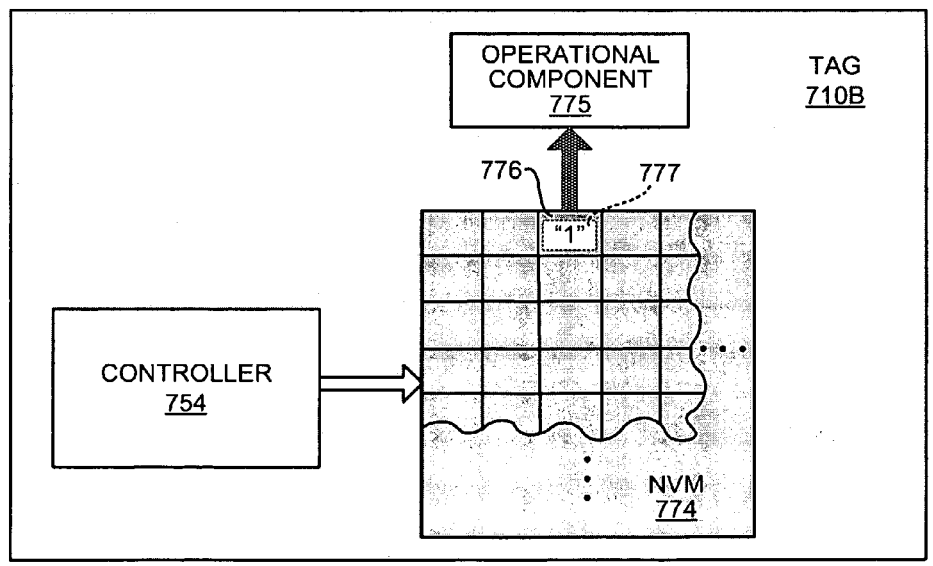
FIG. 7B is a block diagram of another RFID tag that includes an ordinary NVM circuit for storing data such as calibration data to be used by another operational component.

FIG. 7B is a block diagram of RFID tag 710B that includes an ordinary NVM circuit for storing data such as calibration data to be used by another operational component.

Tag 710B includes NVM circuit 774, operational component 775, and controller 754. Parts of tag 710B perform actions that are similar to the actions performed by comparable parts in tag 710A of FIG. 7A, while each part may or may not be formed and function similarly as described below.

NVM circuit 774 is an ordinary NVM circuit that is arranged to store data 777, a logic or non-logic value, such as an ON/OFF state, in individual cells (e.g. cell 776) and provide data 777 upon being addressed. In one embodiment, NVM circuit 774 may be an NVM array comprising cells that are addressable in terms of a row and a column.

In some embodiments, a value for data 777 may be encoded in an amount of charge stored in a device. In another embodiment, data 777 may be at least one logical bit, such as a 1 or a zero, stored in cell 776. Of course, data 777 may need more than one cell, and so on.

Controller 754 is adapted to program data 777 in cell 776. Controller 754 is also arranged to address cell 776 to provide data 777 to operational component 775. In addition, controller 754 may cooperate with other components, such as operational component 775.

Operational component 775 may be adapted to receive data 777 for processing, calibration, and the like. In FIG. 7B, data 777 is input in operational component 775 directly. In other embodiments, data 777 may be routed through any suitable component before being input in operational component 775. For example, data 777 may be first input from cell 776 into a binary output circuit. Then, from the binary output circuit, data 777 may be input in operational component 775.

Furthermore, controller 754 may be adapted to sense a performance of operational component 775. Controller 775 may then determine data 777 so as to adjust the performance. The performance may be optimized, if needed. In some instances, adjusting can be to diminish the performance if, for example, more privacy is required.

This feature of determining what data 777 to program may be invoked spontaneously, autonomously, in response to a received command, and so on. Adjusting may be desired if the performance has changed, for example either due to the passage of time, or due to changed environmental conditions, and so on. Adjusting may also take place while manufacturing or testing a tag, or preparing it for field use. For example, the processor may step through a number of values to adjust an antenna reception of an RFID tag.

Tag 710B may be implemented with fewer or additional components such as support circuitry for NVM circuit 774, communication circuitry for interaction with other devices, and the like.

Figure 7C:
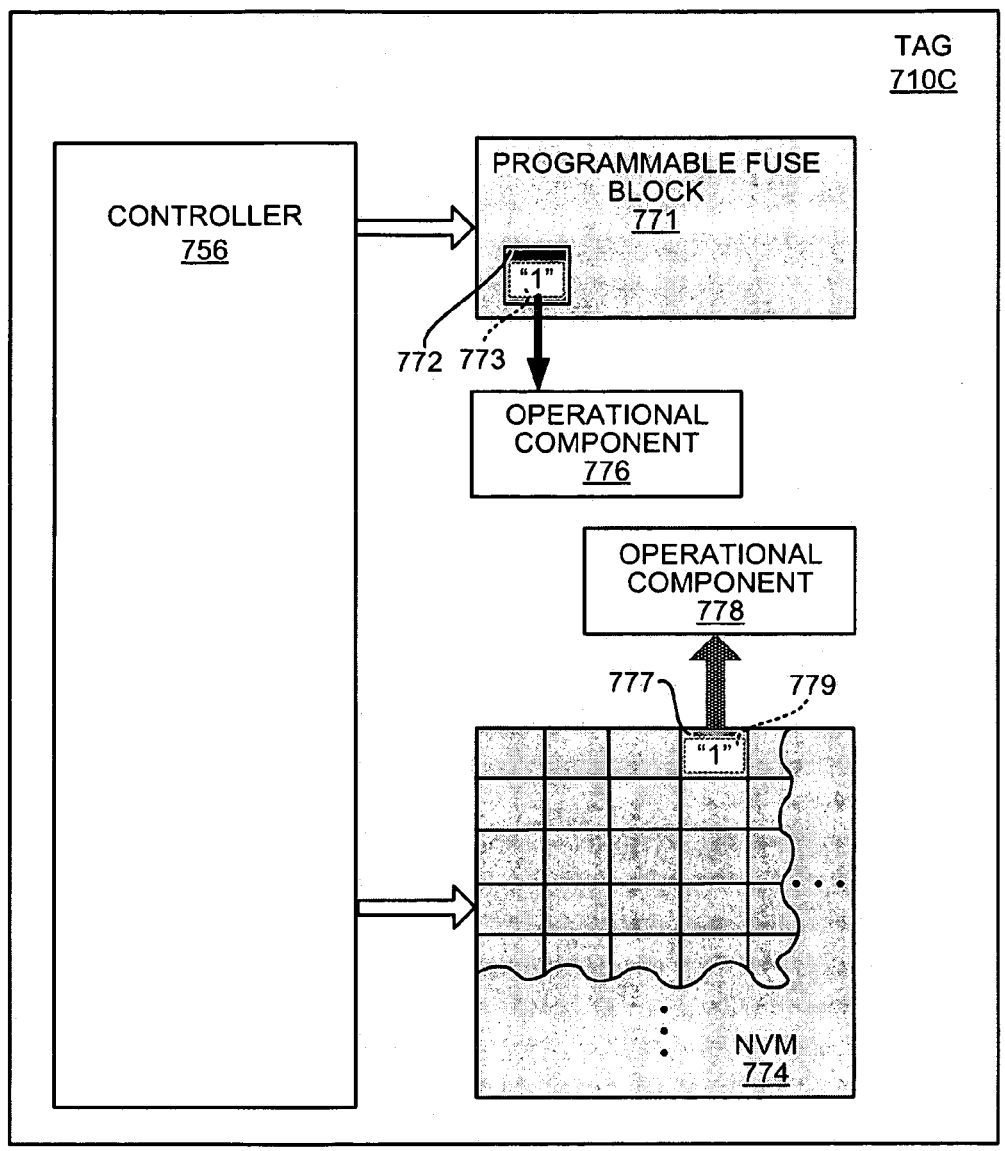
FIG. 7C is a block diagram of a further RFID tag that includes a programmable fuse block such as that of FIG. 1A, and an ordinary NVM circuit such as that of FIG. 1B for storing data to be used by different operational components.

FIG. 7C is a block diagram of a further RFID tag that includes a programmable fuse block such as that of FIG. 1A, and an ordinary NVM circuit such as that of FIG. 1B for storing data to be used by different operational components.

Parts of tag 710C that are similarly numbered in FIGS. 7A and 7B perform actions that are similar to the actions performed by comparable parts in tags 710A and 710B.

Accordingly, programmable fuse block 771 is adapted to provide a fast calibration data (e.g. data 773) to operational component 776, while NVM circuit 774 is adapted to provide data 779 to operational component 778 for programming purposes, and the like, upon being addressed.

Controller 756 may be a combination of controllers 752 and 754 of FIGS. 7A and 7B, and manage programmable fuse block 771 and NVM circuit 774. Consequently, controller 756 may include different blocks to address, program, monitor, and the like, programmable fuse block 771 and NVM circuit 774.

At power up, some analog circuits need calibration. An RFID tag may need several bits for calibration of analog circuits like an oscillator, a demodulator, a rectifier, an antenna tuning, and the like.

Some of the analog circuits (for example the modulator and the oscillator) may require logic bits (i.e. digital high and low signals that are used in the internal DACs), while others like the rectifier and the antenna tuning circuits may actually need an ON or OFF state (e.g. a pFET transistor output with its gate at ground or below for ON and at VDD or above for OFF).

In some applications the bits may be stored in the NVM circuit and read out (as logic signals) during the initialization phase that occurs as an early step of any reader-tag communication. Such a solution is sub-optimal because the initialization phase commonly uses an intrinsic (i.e. uncalibrated) frequency of the oscillator and relies on an uncalibrated demodulator.

Since the reader allows for the possibility of a slow oscillator (up to 50% slow), time may be wasted with the consequence that the overall reader-tag throughput is decreased.

A solution like programmable fuse may provide logic bits after reset, but the cost in term of area may be significant. The programmable fuse area for a number of bits is relatively big because it has to include a charge pump, high voltage switches, and a shift register at every bit location. Furthermore, the programmable fuse does not provide a solution for analog circuits that have to function properly before the reset of the PMU like the rectifier and the antenna tuning circuits.

Figure 8:
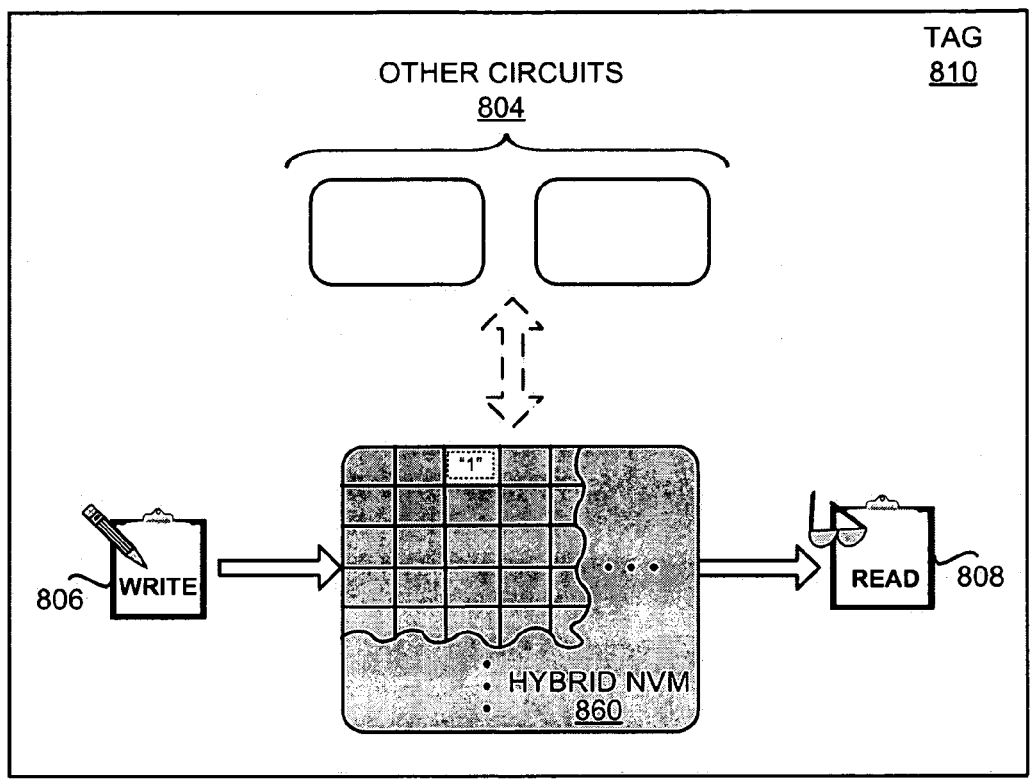
FIG. 8 is a block diagram of an RFID tag having a hybrid Non-Volatile Memory (NVM) circuit according to embodiments, for storing data to be used by other components of the RFID tag.

FIG. 8 is a block diagram of RFID tag 810 having a hybrid Non-Volatile Memory (NVM) circuit according to embodiments, for storing data to be used by other components of the RFID tag.

Tag 810 includes hybrid NVM circuit 860 that is adapted to interact with other circuits 804. Individual cells of hybrid NVM 860 are adapted to store information as a result of "write" operation 806 and provide the stored information as a result of "read" operation 808. The information is stored even during a power-off state of tag 810.

"Read" operation 808, which provides the stored information to one or more of the other circuits 804, may occur during a transition from the power-off state to a power-on state for some parts of hybrid NVM circuit 860. For other parts of hybrid NVM circuit 860, "read" operation 808 may occur during the power-on state upon being addressed by another circuit (e.g. a controller).

As a result, different circuits of tag 810 may receive data for their operation at different states of powering the tag. For example, an oscillator circuit may be provided calibration data during the transition from the power-off state from one part of hybrid NVM circuit 860, while a digital signal processor circuit may be provided programming data after the transition.

The information stored in hybrid NVM circuit 860 may include analog, digital or other types of data. For example, different parts of hybrid NVM circuit 860 may provide logic bits, ON/OFF states, latched outputs for trimming analog circuits, and the like.

Figure 9:
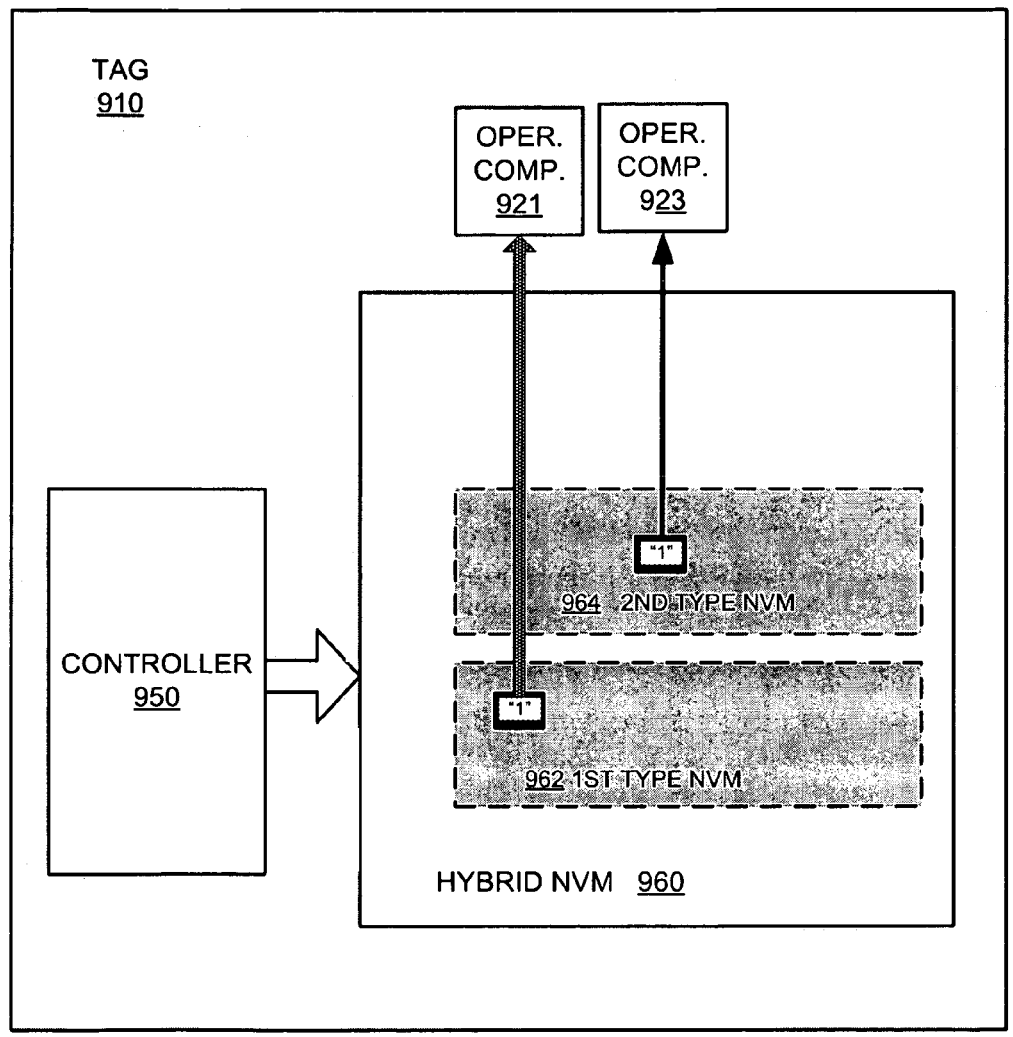
FIG. 9 is a block diagram of an RFID tag having a particular embodiment of the hybrid NVM of FIG. 8 that accommodates two different types of NVM sub-circuits, for storing data to be used by other components of the RFID tag.

FIG. 9 is a block diagram of an RFID tag having a particular embodiment of the hybrid NVM of FIG. 8 that accommodates two different types of NVM sub-circuits, for storing data to be used by other components of the RFID tag.

Hybrid NVM circuit 960 includes first type NVM sub-circuit 962 and second type NVM sub-circuit 964. First type NVM sub-circuit 962 and second type NVM sub-circuit 964 operate as described previously and provide input to operational components 921 and 923, respectively. In one example embodiment, first type NVM sub-circuit 962 may provide a fast output for calibrating operational component 921 during a transition to the power-on state. In another example embodiment, second type NVM sub-circuit 964 may provide programming data to operational component 923 in the power-on state upon being addressed by controller 950.

Controller 950 is adapted to interact with both NVM sub-circuits. The interaction may include programming the NVM sub-circuits, addressing individual cells to output their data, and the like. In one embodiment, hybrid NVM circuit 960 may also include a sub-circuit that is adapted to store one or more fixed bits. In such an embodiment, controller 950 may include a by-passing circuit that arranged to by-pass the one or more fixed bits. Such a by-passing circuit may also include at least one programmable bit.

By integrating first type NVM sub-circuit 962 and second type NVM sub-circuit 964, and combining the control operations in a single controller (950), size and power consumption can be optimized.

Figure 10:
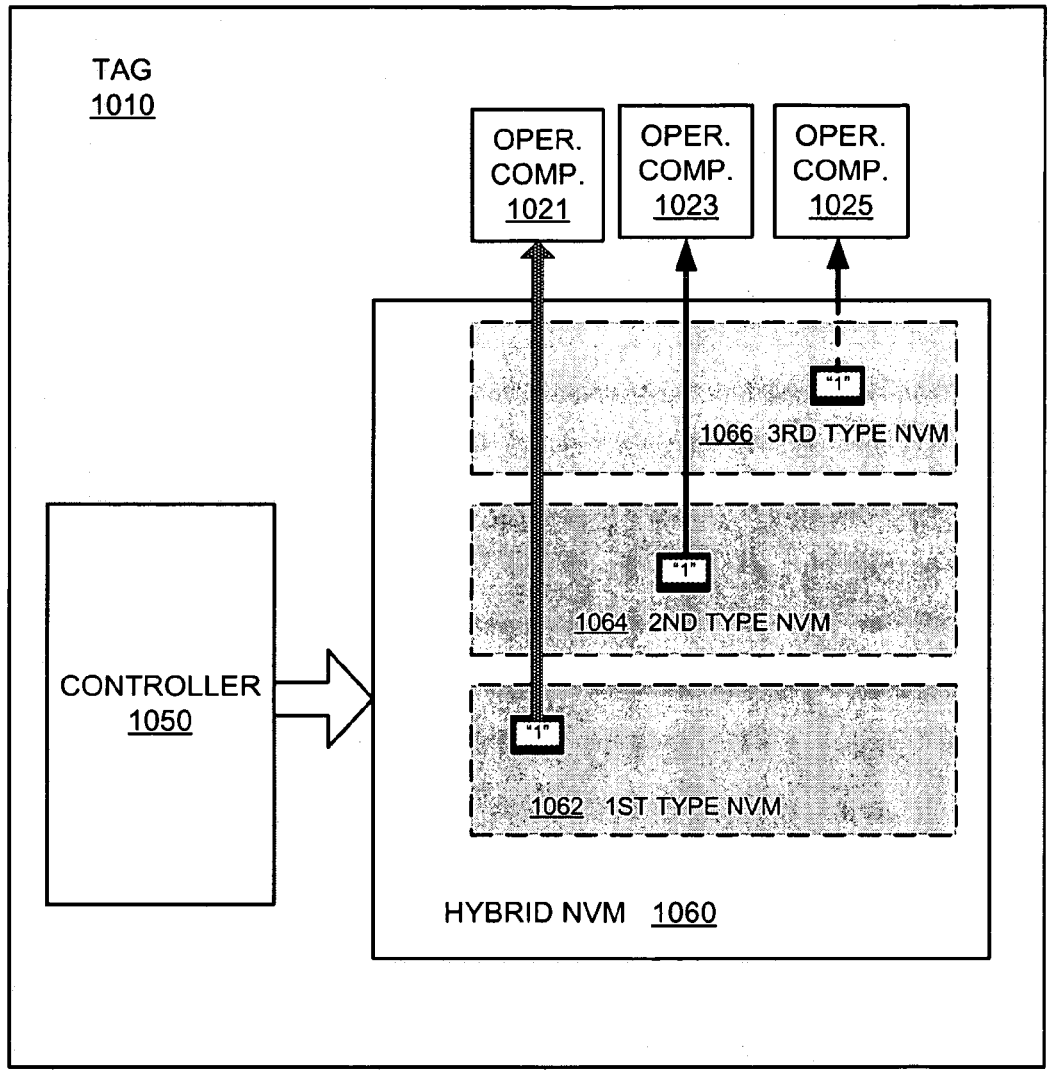
FIG. 10 is a block diagram of an RFID tag having a particular embodiment of the hybrid NVM of FIG. 8 that accommodates three different types of NVM sub-circuits, for storing data to be used by other components of the RFID tag.

FIG. 10 is a block diagram of RFID tag 1010 having a particular embodiment of the hybrid NVM of FIG. 8 that accommodates three different types of NVM sub-circuits, for storing data to be used by other components of the RFID tag.

Parts of tag 1010 that are similarly numbered in tag 910 of FIG. 9 operate in a likewise manner. To illustrate the diversity of the hybrid NVM concept, hybrid NVM circuit 1060 includes three NVM sub-circuits: first type NVM sub-circuit 1062, second type NVM sub-circuit 1064, and third type NVM sub-circuit 1066.

In addition to the first and second type NVM sub-circuits, third type NVM sub-circuit 1066 provides input to operational component 1025. In one embodiment, third type NVM sub-circuit 1066 may provide a latched output for trimming an analog circuit. In a further embodiment, third type NVM sub-circuit 1066 may provide an ON/OFF state output that may be employed to control at least one of a voltage, a frequency, or a current.

Figure 11A:
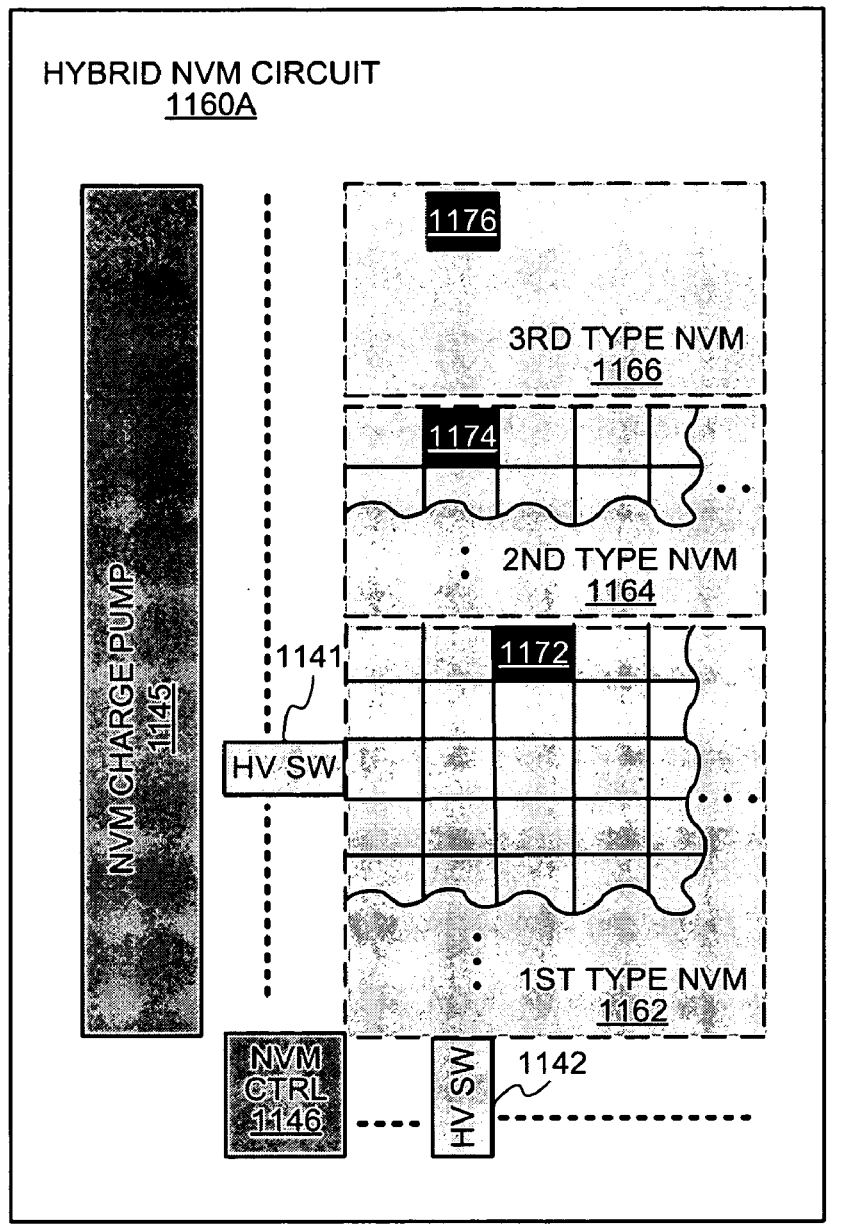
FIG. 11A is a block diagram illustrating an implementation of the hybrid NVM circuit of FIG. 10 according to an embodiment.

FIG. 11A is a block diagram illustrating an implementation of the hybrid NVM circuit of FIG. 10 according to an embodiment.

Hybrid NVM circuit 1160A includes first type NVM sub-circuit 1162, second type NVM sub-circuit 1164, and third type NVM sub-circuit 1166. These NVM sub-circuits are examples of NVM circuits as described in conjunction with previous figures.

NVM sub-circuits commonly comprise a number of cells (e.g. cells 1172, 1174, and 1176), which store the data to be consumed by operational components. NVM sub-circuits may be implemented in form of an NVM array comprising cells that are addressable in terms of a row and a column. First type NVM sub-circuit 1162 and second type NVM sub-circuit 1164 are examples of NVM arrays, while third type NVM sub-circuit 1166 illustrates a non-array NVM circuit.

In some embodiments, a non-volatile memory cell may be constructed using a floating-gate pFET readout transistor having its source tied to a power source and its drain providing a current, which can be sensed to determine the state of the cell. The gate of the pFET readout transistor provides for charge storage, which can be used to represent information such as binary bits. A control capacitor structure having its first terminal coupled to a first voltage source and its second terminal coupled to the floating gate and a tunneling capacitor structure having its first terminal coupled to a second voltage source and its second terminal coupled to the floating gate may be utilized in each embodiment.

The control capacitor structure is fabricated so that it has much more capacitance than does the tunneling capacitor structure (and assorted stray capacitance between the floating gate and various other nodes of the cell). Manipulation of the voltages applied to the first voltage source and second voltage source controls an electric field across the capacitor structure and pFET dielectrics and thus Fowler-Nordheim tunneling of electrons onto and off of the floating gate, thus controlling the charge on the floating gate and the information value stored thereon.

High voltage switches 1141 and 1142 are examples of a series of high voltage switches that are arranged to provide the first and the second voltages for programming and erasing of the NVM cells.

NVM controller 1146 is arranged to program and address individual cells of the NVM sub-circuits to output their data by managing high voltage switches 1141, 1142, and the like.

NVM charge pump 1145 is an electronic circuit that uses capacitors as energy storage elements to convert low voltages into higher voltage outputs. Charge pump circuits are typically capable of high efficiencies, sometimes as high as 90-95%.

NVM charge pump 1145 may use switches to control a connection of voltages to the capacitor. For example, to generate a higher voltage, a first stage may involve the capacitor being connected across a voltage and charged up. In a second stage, the capacitor is disconnected from the original charging voltage and reconnected with its negative terminal to the original positive charging voltage. Because the capacitor retains the voltage across it (ignoring leakage effects) the positive terminal voltage is added to the original, effectively doubling the voltage. This higher voltage output may then be smoothed by the use of another capacitor.

Figure 11B:
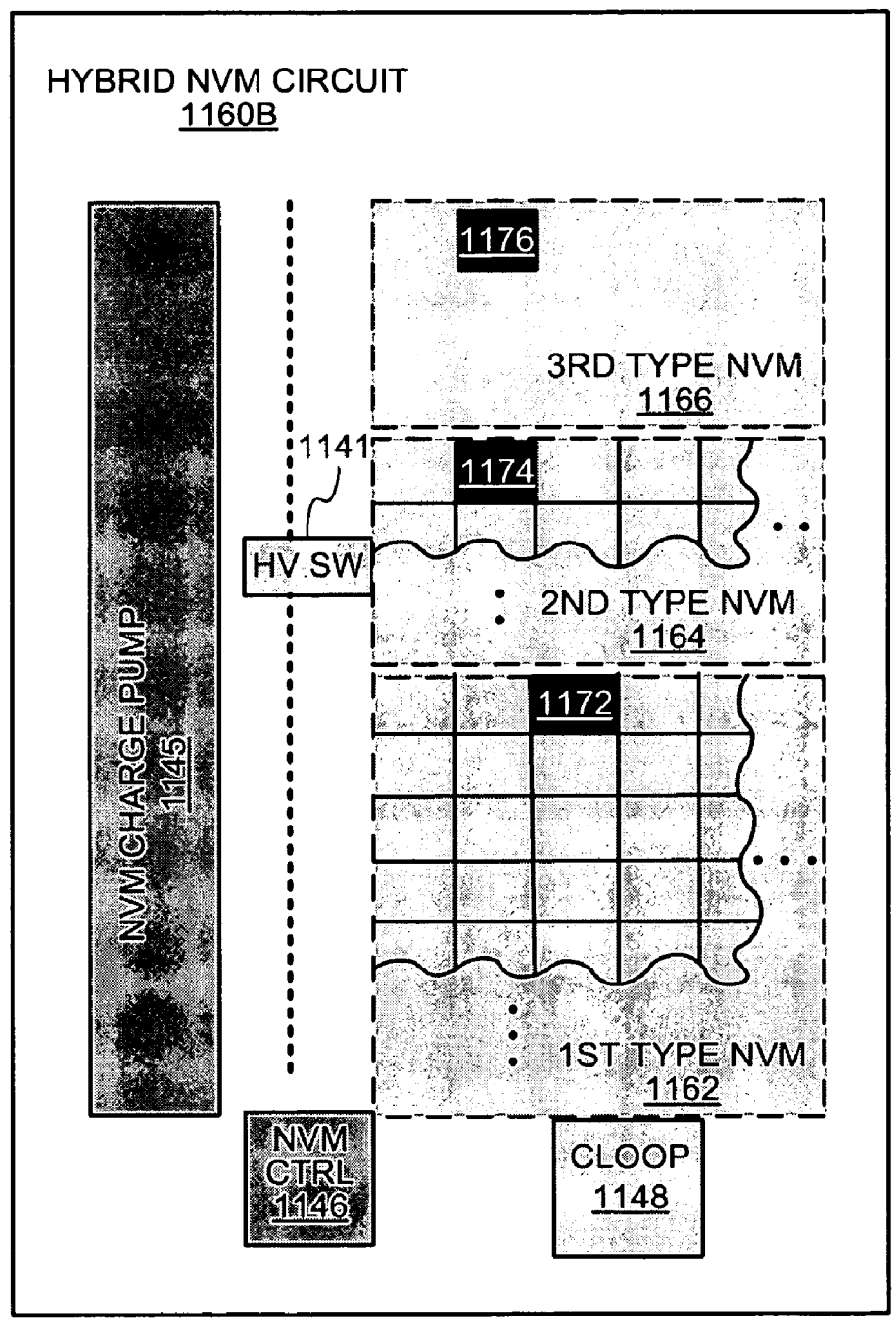
FIG. 11B is a block diagram illustrating an implementation of the hybrid NVM circuit of FIG. 10 according to another embodiment.

FIG. 11B is a block diagram illustrating an implementation of the hybrid NVM circuit of FIG. 10 according to another embodiment. Parts of hybrid NVM circuit 1160B that are similarly numbered in hybrid NVM circuit 1160A of FIG. 11A operate in a likewise manner.

To emphasize that NVM sub-circuits may or may not include arrays, all three NVM sub-circuits in hybrid NVM circuit 1160B are illustrated in array form. Differently from FIG. 11A, hybrid NVM circuit 1160B includes CLOOP 1148 in place of high voltage switch 1142.

In some embodiments, a Control Loop for Overtunneling Current Prevention (CLOOP) device may be implemented instead of a series of high voltage switches that control rows and columns of NVM arrays within the hybrid NVM circuit. CLOOP 1148 is such a device. Structure and operation of a CLOOP device is described in detail in U.S. Pat. No. 6,853,583.

The examples of FIGS. 11A and 11B are for illustration purposes, and do not constitute a limitation on the present invention. Other embodiments may be implemented using other circuits and other combinations of circuits for providing common support circuitry to a plurality of NVM sub-circuits of a hybrid NVM circuit, without departing from the scope and spirit of the invention. For example, the hybrid NVM circuit may further include an oscillator, an ESD protection device, and the like.

Figure 12:
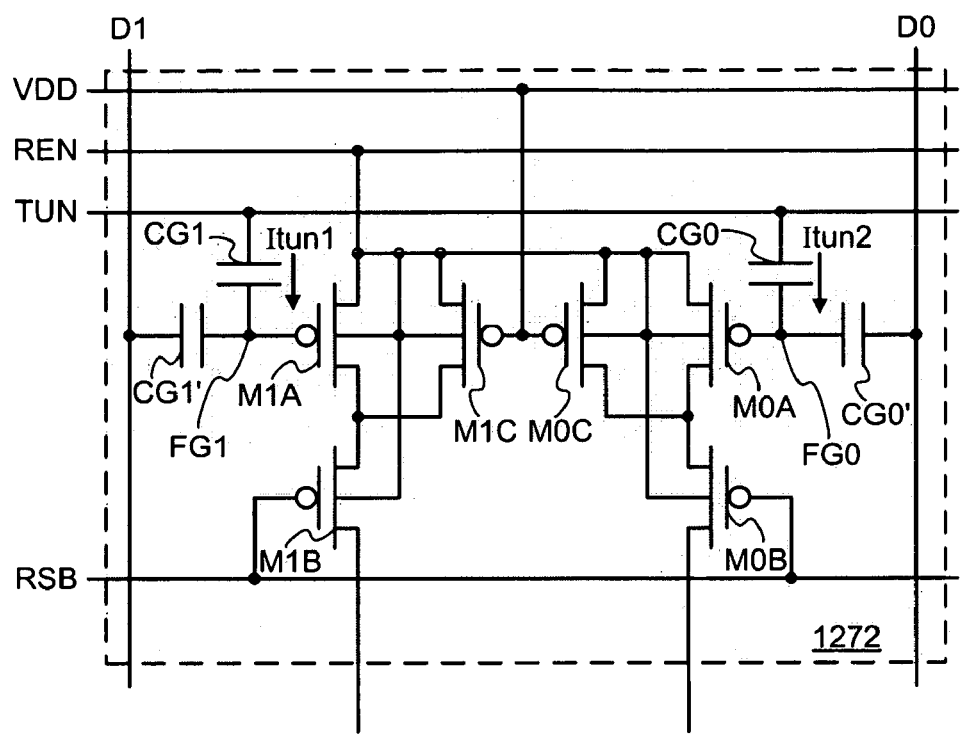
FIG. 12 schematically illustrates an embodiment of an ordinary type of NVM cell that may be part of the hybrid NVM of FIG. 9 or FIG. 10.

FIG. 12 schematically illustrates an embodiment of an ordinary type of NVM cell that may be part of the hybrid NVM of FIG. 9 or FIG. 10.

NVM cell 1272 is adapted to store and provide a logic value such as a "1" or a "0" bit. While FIG. 6 shows an example implementation, an "ordinary" NVM cell may be implemented in any way known in the art.

Schematic diagram of NVM cell 1272 shows the tunneling transistors as capacitors denoted CG1 and CG0 and the control transistors as capacitors denoted CG1' and CG0' for clarity but they may be implemented with pFETs, for example as described in U.S. patent application Ser. No. 11/839,935 (IMPJ-0057) filed on May 5, 2004.

In this embodiment, VDD may be provided at all times to bias the gates of transistors M1C and M0C. REN (row enable) and RSB (row select bar) are provided to address individual cells such as NVM cell 1272 in the NVM array. TUN is tunneling signal provided to tunneling capacitors CG1 and CG0. The signals VDD, REN, TUN and RSB are the row control signals, although VDD need not be applied via a row and could instead be applied via a column. The column control signals comprise the data signals on lines D1 and D0.

Transistors M1C and M0C have their gates coupled together and to VDD and their sources, drains and well connections coupled to the corresponding sources, drains and well connections of respective readout transistors M1A and M0A. This is done in order to avoid disturbing the contents of the cell when it is not selected.

During a read operation, the REN (row enable) line is set to VDD and with the gates of M1C and M0C at VDD. Thus, M1C and M0C are not conducting and readout transistors M1A and M0A operate normally to provide an output current as a function of charge stored on corresponding floating gates FG1 and FG0.

During a write operation, REN is set to approximately half the tunneling voltage. With VDD on the gates of M1C and M0C, M1C and M0C conduct, effectively connecting the drain nodes of M1A and M0A to REN. Since the drain, source, and bulk nodes of both M1A and M0A are set to half the tunneling voltage, there can be no tunneling across M1A or M0A. Furthermore, TUN is also set to half the tunneling voltage during the write mode. Accordingly, there can be no tunneling across CG1 or CG0.

Figure 13:
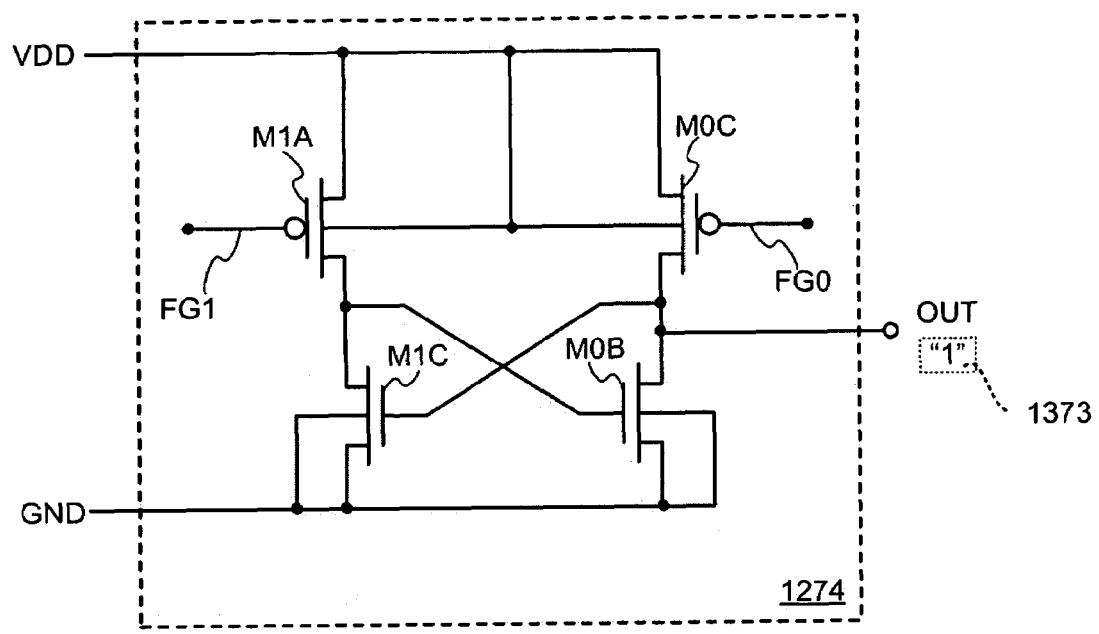
FIG. 13 schematically illustrates an embodiment of another type of NVM cell that may be part of the hybrid NVM of FIG. 9 or FIG. 10.

FIG. 13 schematically illustrates an embodiment of another type of NVM cell that may be part of the hybrid NVM of FIG. 9 or FIG. 10.

NVM cell 1274 is one embodiment of a programmable fuse implemented using Metal Oxide Field Effect Transistors (MOSFETs). NVM cell 1274 comprises cross-coupled transistor pair M1C and M0B, which form a half latch circuit. In the MOSFET embodiment, M1C and M0B may be nFETs. A gate terminal of M1C is coupled to a drain of M0B. Similarly, a gate terminal of M0B is coupled to a drain of M1C. Sources of both transistors are coupled together and are arranged to receive a ground signal.

The drain terminal of M0B is arranged to provide output signal OUT, which includes stored value 1373. In one embodiment, stored value 1373 may be a digital value "0" or "1".

Drain terminals of pFET type transistors M1A and M0C are coupled to drain terminals of M1C and M0B, respectively. Source terminals of M1A and M0C are coupled to a supply voltage (VDD). The source terminals are also arranged to receive a reset signal or a power-on reset (POR) signal.

Gate terminals of M1A and M0C (FG1 and FG0) are arranged as floating gates that store a charge such that NVM cell 1274 settles on a state determined by the charges of the floating gates upon receiving a power-up signal (VDD applied) or the reset signal.

Whereas MC1 and M0B form a half latch circuit, programmable fuses may be implemented using full latch circuits, multiple pairs of half latch circuits, and the like. Furthermore, the transistors are not restricted to MOSFET type transistors, and other types devices may also be employed.

The programmable fuse forming NVM cell 1274 is termed "self-latching", meaning that once power is applied to the fuse, the latch of the associated fuse will eventually settle to some state. Details of programmable fuses are described in more detail in U.S. patent application Ser. No. 10/813,907 (IMPJ-0027A) filed on Mar. 30, 2004; Ser. No. 10/814,866 (IMPJ-0027B) filed on Mar. 30, 2004; and Ser. No. 10/814,868 (IMPJ-0027C) filed on Mar. 30, 2004.

Figure 14:
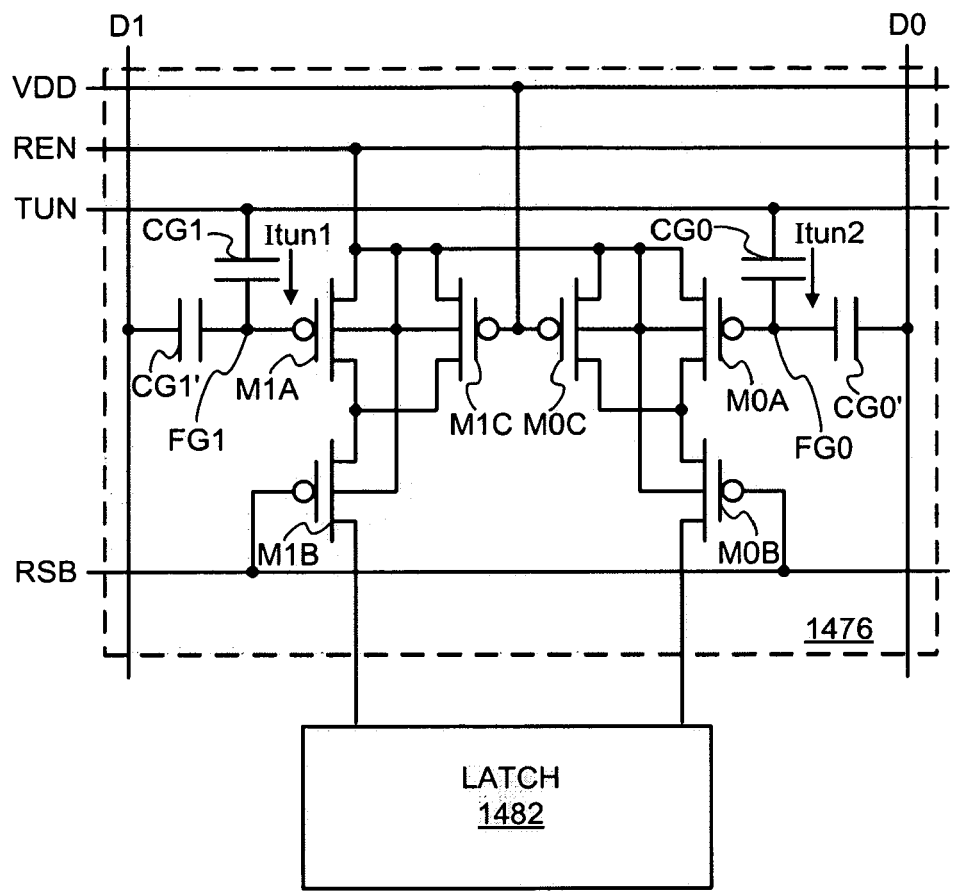
FIG. 14 schematically illustrates an embodiment of yet another type of an NVM cell that may be part of the hybrid NVM of FIG. 9 or FIG. 10.

FIG. 14 schematically illustrates an embodiment of yet another type of an NVM cell that may be part of the hybrid NVM of FIG. 9 or FIG. 10.

Employing latch 1482, NVM cell 1476 provides a latched output to other operational components. This makes an output of NVM cell 1476 suitable for trimming analog circuits. Parts of NVM cell 1476 that are similarly numbered in NVM cell 1272 of FIG. 12 operate in a likewise manner.

In addition to the components of NVM cell 1272 of FIG. 12, NVM cell 1476 includes latch 1482, which is coupled to drains of M1B and M0B. Sources of M1B and M0B are coupled to drains of M1C-M1A and M0C-M0A transistor pairs. RSB signal controls gate terminals of M1B and M0B providing an output to latch 1482.

Latch 1482 is arranged to settle on a state upon receiving the output of NVM cell 1476 such that the stored output can be used to trim an analog circuit, and the like.

Figure 15:
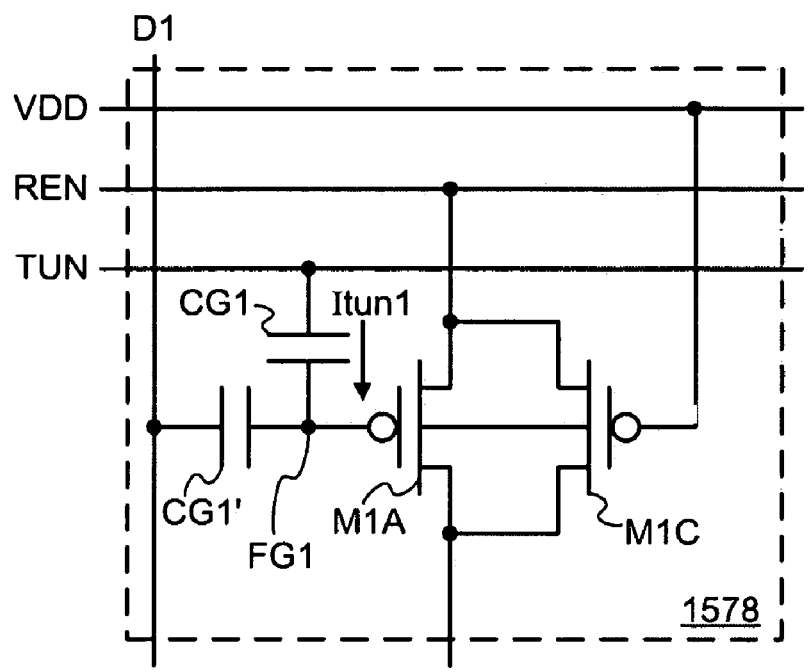
FIG. 15 schematically illustrates an embodiment of one more type of an NVM cell that may be part of the hybrid NVM of FIG. 9 or FIG. 10.

FIG. 15 schematically illustrates an embodiment of one more type of an NVM cell that may be part of the hybrid NVM of FIG. 9 or FIG. 10.

NVM cell 1578 includes transistors M1A and M1C, which are coupled together at their source and drain terminals. The source terminals are arranged to receive REN signal, while the drain terminals are arranged to provide an output.

A gate terminal of M1C is arranged to receive supply voltage VDD. A tunneling transistor as capacitor denoted CG1 and a control transistor as capacitor denoted CG1' are coupled to a gate terminal of M1A, and function as described above in conjunction with FIG. 12.

An output of NVM cell 1578 may be an ON state of an OFF state. The output may be used to control a current, a voltage, or a frequency of an operational component.

FIGS. 16A-16G are diagrams illustrating various operational components that may use an output of a hybrid NVM such as the NVM circuit of FIG. 9 or FIG. 10.

Figure 16A:
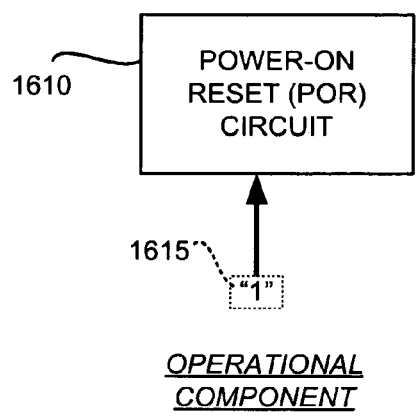
FIGS. 16A-16G are diagrams illustrating various operational components that may use an output of a hybrid NVM such as the NVM device of FIG. 9 or FIG. 10.

FIG. 16A is a block diagram of an embodiment of an operational component that is a power-on reset (POR) circuit 1610. Configuration data 1615 may control any operational parameter of POR circuit 1610, such as a reset threshold.

Figure 16B:
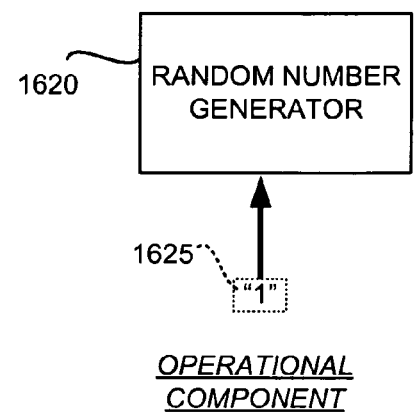

FIG. 16B is a block diagram of an embodiment of an operational component that is a random number generator (RNG) 1620. Configuration data 1625 may control any operational parameter of RNG 1620, such as to supply an encoded seed for generating random numbers.

Figure 16C:
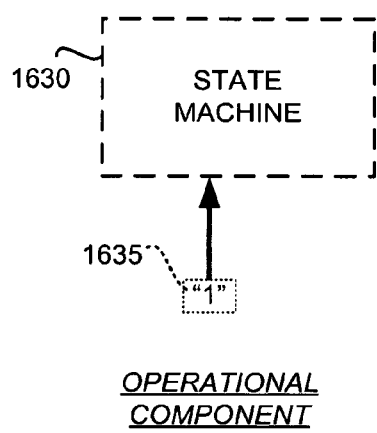

FIG. 16C is a block diagram of an embodiment of an operational component that is a state machine 1630. Configuration data 1635 may control any operational parameter of state machine 1630.

State machine 1630 may be a standalone state machine for the whole tag. Or it may be a state machine for an operational component, such as those described in this document. For example, it may be a state machine of hybrid NVM memory 960 of FIG. 9, or it may be a state machine of controller 950.

In some embodiments, an operational component is to receive one of a number of available clocks signals. In these embodiments, a state machine for the operational component includes a multiplexer. The multiplexer may receive configuration data in the form of one or more bits. The received bits control which one of the available clocks signals is received through the multiplexer. In the event where there are only two clock signals, only a single bit is needed.

In some embodiments, state machine 1630 deals with whether a tag has the feature of backscattering continuously, and how to address a reader command to do so. Backscattering continuously would be performed in a testing mode, for measuring the backscattered power. During that mode, contrary to what is shown in FIG. 3, the tag would be backscattering even during the R→T sessions 412 of FIG. 4.

In some embodiments, configuration data 1635 can encode one of two values. The first value indicates that a backscatter continuously feature is available, while the second value indicates that it is not. Various combinations, features, or alternative approaches are possible.

In a number of embodiments, configuration data 1635 causes the tag to ignore a command by a reader to backscatter continuously. That embodiment is particularly useful where the tag is not capable of backscattering continuously, or has been otherwise programmed not to.

In other embodiments, configuration data 1635 causes the tag to be in a state of backscattering continuously. That embodiment would be useful in a situation where performing such testing is desired, or in jurisdictions where such testing is required. In one of these embodiments, configuration data 1635 is enabled when a test command is received. In another one of these embodiments, configuration data 1635 is enabled at power up, for example in response to a POR signal.

In yet other embodiments, configuration data 1635 causes the tag to react to a command by a reader to backscatter continuously. Reacting can be by issuing a response, such as non-compliance or intended compliance.

Figure 16D:
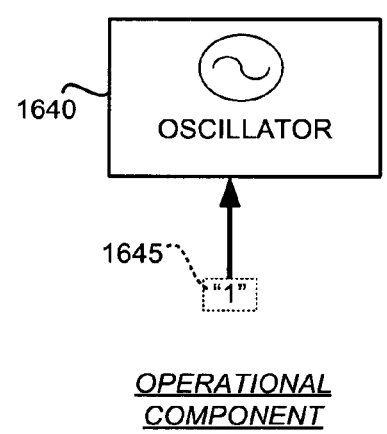

FIG. 16D is a block diagram of an embodiment of an operational component that is an oscillator 1640. Oscillator 1640 may also be known as a clock signal generator, or may be a part of a clock signal generator. Configuration data 1645 may control any operational parameter of oscillator 1640, or a broader clock signal generator.

Figure 16E:
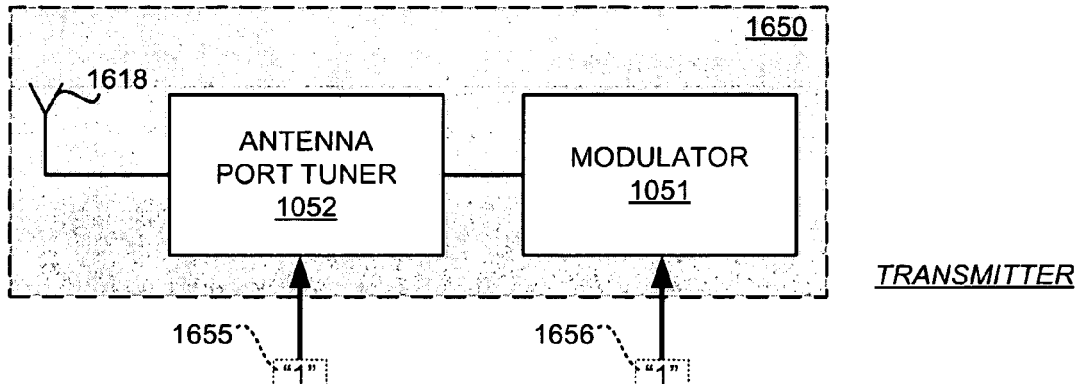

FIG. 16E is a block diagram of an embodiment of a transmitter 1650. Transmitter 1650 as shown is used for outputting data by backscattering.

Transmitter 1650 may involve an antenna 1618, an operational component that is a modulator 1051, and an operational component that is an antenna port tuner 1052. Configuration data may control either modulator 1051, or antenna port tuner 1052, or both. For example, configuration data 1656 may control any operational parameter of modulator 1051, such as modulation depth and/or transmitted backscattered signal power. In addition, configuration data 1655 may control any operational parameter of antenna port tuner 1052, such as its impedance. In this case, the impedance may have adjustable reactance components, such as capacitance and inductance. And again, the distinction is repeated that modulator 1051 would output via backscattering data other than configuration data 1656.

Figure 16F:
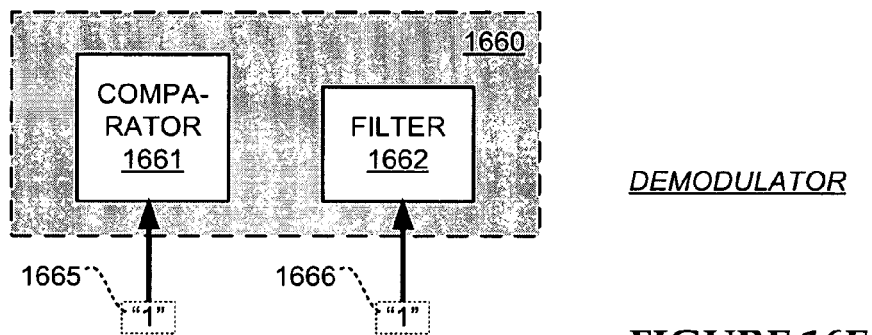

FIG. 16F is a block diagram of an embodiment of an operational component that is a demodulator 1660. Configuration data may control any number of operational components of demodulator 1660. For example, configuration data 1665 may control a comparator 1661, configuration data 1666 may control a filter 1662, and so on.

Figure 16G:
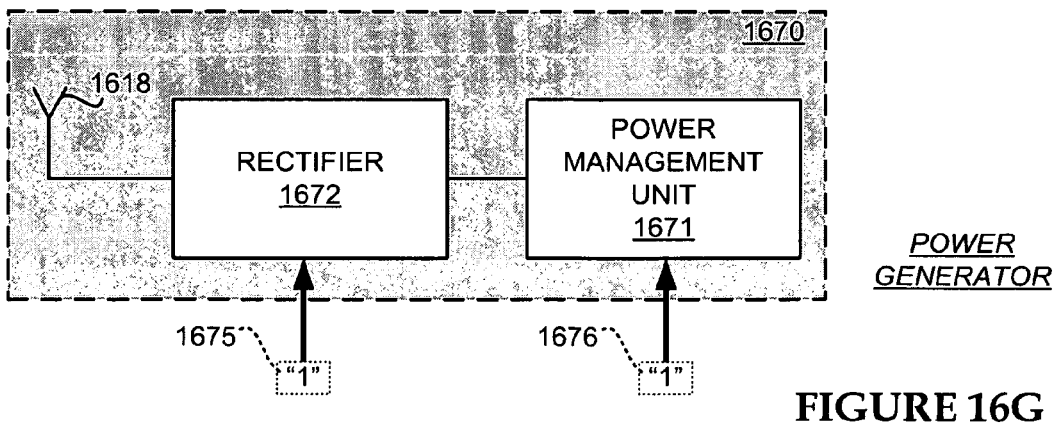

FIG. 16G is a block diagram of an embodiment of a power generation circuit 1670. Circuit 1670 as shown is used for generating electrical power for the tag.

Circuit 1670 may involve antenna 1618, an operational component that is a rectifier 1672, and an operational component that is a power management unit (PMU) 1671. Configuration data may control either rectifier 1672, or PMU 1671, or both. For example, configuration data 1675 may control any operational parameter of rectifier 1672, and configuration data 1676 may control any operational parameter of PMU 1671.

Figure 17:
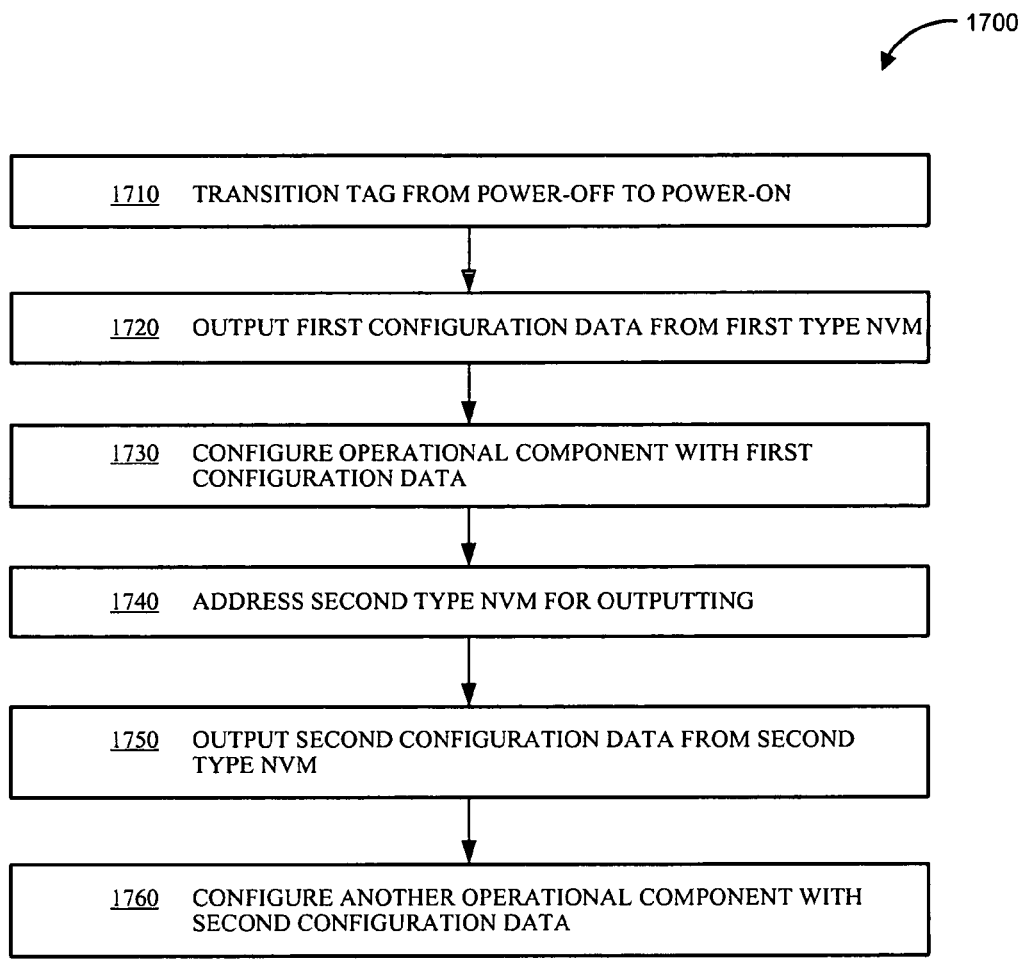
FIG. 17 is a logic flow diagram illustrating a process of an RFID tag using a hybrid NVM for its operational components.

FIG. 17 is a logic flow diagram illustrating a process of an RFID tag using a hybrid NVM for its operational components.

Process 1700 begins at operation 1710, where the tag transitions from a power-off state to a power-on state. The transition may be triggered by a wave received by the tag from a reader, as described in conjunction with FIG. 3. Processing moves from operation 1710 to operation 1720.

At operation 1720, stored first configuration data is output from a first type NVM circuit as a result of the transition from the power-off state to the power-on state. Processing advances from operation 1720 to operation 1730.

At operation 1730, an operational component of the tag circuit is configured, as controlled by the outputted first configuration data. The operational component can be operated as controlled by an exhibited characteristic of a configurable circuit of the component. The characteristic is variable and dependent on the input configuration data, as per the above. Processing then proceeds to operation 1740.

At operation 1740, a second type NVM circuit is addressed for outputting selected second configuration data. If the second type NVM circuit is an NVM array, selected cells may be addressed by applying a predetermined signal to the rows and columns of the selected cells. Processing then moves to operation 1750.

At operation 1750, stored second configuration data is output from the second type NVM circuit as a result of addressing the selected cells. Processing advances from operation 1750 to operation 1760.

At operation 1760, another operational component is configured with the second configuration data. If the data is latched, it is received from the latch.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. An RFID tag capable of a power-on state and a power-off state, comprising:
    an antenna configured to receive a modulated wave;
    a power management unit configured to transition the tag from the power-off state to the power-on state in response to the received wave; and
    a hybrid non-volatile memory (NVM) block that includes:
        a first circuit of at least one of first type NVM cell;
        a second circuit of at least one of second type NVM cell that is different from the first type NVM cell; and
        support circuitry, wherein a portion of the support circuitry is arranged to support the first circuit and the second circuit, wherein one of the first circuit and the second circuit is arranged to provide an output upon transitioning to a power-on state; and wherein another of the first circuit and the second circuit is arranged to provide an output upon being addressed.

2. The RFID tag of claim 1, wherein the first circuit is arranged to provide an output faster than an output of the second circuit.

3. The RFID tag of claim 1, wherein one of the first circuit and the second circuit is arranged in an array configuration; and wherein another of the first circuit and the second circuit is arranged in a non-array configuration.

4. The RFID tag of claim 1, wherein the NVM block further includes at least one additional type NVM circuit, wherein the portion of the support circuitry is arranged to support at least one additional type NVM circuit.

5. The RFID tag of claim 1, wherein the first circuit is a programmable fuse circuit.

6. The RFID tag of claim 5, wherein the programmable fuse circuit includes at least one of: a one time programmable (OTP) fuse cell and a multiple time programmable (MTP) fuse cell.

7. The RFID tag of claim 5, wherein the programmable fuse circuit is programmable for storing its logic value.

8. The RFID tag of claim 5, wherein the programmable fuse circuit is adapted to output its stored logic value upon receiving a Power On Reset (POR) signal.

9. The RFID tag of claim 1, wherein the second circuit is an ordinary NVM circuit that is arranged to provide a logic value to an operational component.

10. An RFID tag capable of a power-on state and a power-off state, comprising:
    an antenna configured to receive a modulated wave;
    a power management unit configured to transition the tag from the power-off state to the power-on state in response to the received wave; and
    a hybrid non-volatile memory (NVM) block that includes:
    a first circuit of at least one of first type NVM cell;
    a second circuit of at least one of second type NVM cell that is different from the first type NVM cell, wherein the second circuit is an ordinary NVM circuit that is arranged to provide a logic value to an operational component, and wherein the second circuit includes at least one NVM cell that is arranged to provide an output for trimming an analog operational component; and
    support circuitry, wherein a portion of the support circuitry is arranged to support the first circuit and the second circuit.

11. The RFID tag of claim 10, further comprising:
    a latch to store the logic value outputted from the NVM cell.

12. The RFID tag of claim 10, wherein the second circuit is arranged to provide one of: an ON state and an OFF state to the operational component.

13. The RFID tag of claim 12, wherein the second circuit includes a transistor switch circuit that is arranged to control one of: a voltage, a current, and a frequency.

14. The RFID tag of claim 10, wherein the support circuitry include at least one of a charge pump circuit, a controller circuit, and a plurality of high voltage switch circuits.

15. The RFID tag of claim 14, wherein the support circuitry further include a control loop for overtunneling protection (CLOOP) circuit.

16. The RFID tag of claim 14, wherein the controller circuit is adapted to program at least one of: the first circuit and the second circuit.

17. The RFID tag of claim 14, wherein the controller circuit is further adapted to:
    evaluate a performance of the operational component associated with the RFID tag; and
    determine a value to be programmed in at least one of: the first circuit and the second circuit for improving the performance of the operational component.

18. The RFID tag of claim 10, wherein cells of at least one of the first circuit and the second circuit are arranged to be programmed by one of: tunneling and hot electron injection.

19. The RFID tag of claim 10, wherein the second circuit comprises NVM cells that are arranged in row and column bits of an NVM array and at least one NVM cell is adapted to output its stored logic value upon being addressed according to its row and column.

20. The RFID tag of claim 10, wherein at least one additional operational component that is subject to calibration upon transitioning from the power-off state to the power-on state, wherein the additional operational component is arranged to receive an output of one of the first circuit and the second circuit for calibration.

21. The RFID tag of claim 20, wherein
the additional operational component includes one of an oscillator, a demodulator, a modulator, a tunable antenna circuit, a rectifier, and a memory.

22. A method for an RFID tag capable of a power-on state and a power-off state, comprising:
storing a plurality of values in a plurality of NVM cells, wherein the NVM cells are adapted to store the values even during a power-off state;
upon encountering a triggering event, transitioning from the power-off state to the power-on state;
outputting a first portion of NVM cells upon powering support circuitry;
outputting a second portion of NVM cells upon being addressed by the support circuitry, wherein the support circuitry is shared by the first portion of NVM cells and the second portion of NVM cells; and
trimming an analog operational component responsive to an output of the second portion of NVM array cells.

23. The method of claim 22, further comprising:
outputting the second portion of NVM cells as a result of a stored value in at least one of the first portion of NVM cells.

24. The method of claim 22, wherein
the first portion of NVM cells includes at least one of: a one time programmable (OTP) fuse cell and a multiple time programmable (MTP) fuse cell.

25. The method of claim 22, further comprising:
programming the first portion of NVM cells for storing their logic value.

26. The method of claim 25, further comprising:
evaluating a performance of at least one operational component; and
determining a value to be programmed in the first portion of NVM cells for improving the performance.

27. The method of claim 22, wherein
the second portion of the NVM cells are NVM bits of an NVM array, and the NVM bits are outputted as a result addressing of rows and columns of the NVM array by a control circuit.

28. The method of claim 27, wherein
the second portion of NVM bits include at least one of a programmable bit and a fixed bit.

* * * * *

UNITED STATES PATENT AND TRADEMARK OFFICE
CERTIFICATE OF CORRECTION

PATENT NO. : 7,307,534 B2  Page 1 of 1
APPLICATION NO. : 11/237012
DATED : December 11, 2007
INVENTOR(S) : Pesavento It is certified that error appears in the above-identified patent and that said Letters Patent is hereby corrected as shown below:

In column 1, line 7, delete "application" and insert -- applications --, therefor.

In column 1, line 8, after "7,212,446" insert -- ; --.

In column 7, line 48, delete "5.33," and insert -- 533, --, therefor.

In columns 8 and 9, lines 66-67 and lines 1-2, delete "Data 773 encodes at least one value, or a series of values, for one or more operational components such as operational component 776. In some embodiments, data 773 is at least one logical bit, such as a 1 or a zero, stored in cell 772." and insert the same on Line 65, after "like.", as the continuation of the same paragraph.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,307,534 B2  Page 1 of 1
APPLICATION NO. : 11/237012
DATED : December 11, 2007
INVENTOR(S) : Pesavento It is certified that error appears in the above-identified patent and that said Letters Patent is hereby corrected as shown below:

In column 1, line 7, delete "application" and insert -- applications --, therefor.

In column 1, line 8, after "7,212,446" insert -- ; --.

In column 7, line 48, delete "5.33," and insert -- 533, --, therefor.

In columns 8 and 9, lines 66-67 and lines 1-2, delete "Data 773 encodes at least one value, or a series of values, for one or more operational components such as operational component 776. In some embodiments, data 773 is at least one logical bit, such as a 1 or a zero, stored in cell 772." and insert the same on Line 65, after "like.", as the continuation of the same paragraph.

Signed and Sealed this

Tenth Day of June, 2008

JON W. DUDAS
*Director of the United States Patent and Trademark Office*